(12) United States Patent
Ogawa et al.

(10) Patent No.: US 10,939,062 B2
(45) Date of Patent: Mar. 2, 2021

(54) SOLID-STATE IMAGING APPARATUS AND ELECTRONIC EQUIPMENT

(71) Applicant: SONY SEMICONDUCTOR SOLUTIONS CORPORATION, Kanagawa (JP)

(72) Inventors: Koji Ogawa, Kanagawa (JP); Tadayuki Taura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/486,255

(22) PCT Filed: Feb. 26, 2018

(86) PCT No.: PCT/JP2018/006878
§ 371 (c)(1),
(2) Date: Aug. 15, 2019

(87) PCT Pub. No.: WO2018/163873
PCT Pub. Date: Sep. 13, 2018

(65) Prior Publication Data
US 2020/0228738 A1 Jul. 16, 2020

(30) Foreign Application Priority Data

Mar. 9, 2017 (JP) ................................. 2017-044882

(51) Int. Cl.
*H04N 5/374* (2011.01)
*H04N 5/378* (2011.01)
(Continued)

(52) U.S. Cl.
CPC ......... *H04N 5/3698* (2013.01); *G06F 1/3203* (2013.01); *H04N 5/378* (2013.01); *H04N 5/37455* (2013.01)

(58) Field of Classification Search
CPC .. H04N 5/3698; H04N 5/37455; H04N 5/378; G06F 1/3203
See application file for complete search history.

(56) References Cited

U.S. PATENT DOCUMENTS 10,129,495 B2 * 11/2018 Fu .......................... G06F 1/3234
10,395,376 B2 * 8/2019 Fu ............................. G06K 9/46
(Continued)

FOREIGN PATENT DOCUMENTS

| JP | 2015-035172 A | 2/2015 |
| WO | 2016/053763 A1 | 4/2016 |
| WO | 2016/053879 A1 | 4/2016 |

OTHER PUBLICATIONS

International Search Report and Written Opinion of PCT Application No. PCT/JP2018/006878, dated May 15, 2018, 09 pages of ISRWO.

*Primary Examiner* — Hung H Lam
(74) *Attorney, Agent, or Firm* — Chip Law Group

(57) ABSTRACT

The present disclosure relates to a solid-state imaging apparatus and electronic equipment that can reduce power consumption. In an AD converter for each unit pixel or each shared pixel unit, a pixel signal is compared with a reference signal temporally changing. In addition, a magnitude of a pixel signal of a pixel of interest is compared with a magnitude of each of pixel signals of neighboring pixels located in a neighborhood of the pixel of interest using the reference signal, and a result of comparison of the magnitudes is held in a data storage section. The present disclosure can be applied to a back-illuminated solid-state imaging apparatus, for example.

7 Claims, 29 Drawing Sheets

(51) Int. Cl.
  *H04N 5/369*     (2011.01)
  *H04N 5/3745*    (2011.01)
  *G06F 1/3203*    (2019.01)

(56)              References Cited

U.S. PATENT DOCUMENTS

2014/0319325 A1* 10/2014 Kawahito ........... H03M 1/0646
                                              250/208.1
2015/0029372 A1*  1/2015 Lee .................... H03M 1/36
                                              348/308
2016/0091947 A1   3/2016 Govil et al.
2016/0092735 A1*  3/2016 Govil ................. G06K 9/3233
                                              382/103
2017/0161579 A1*  6/2017 Gousev ............... G06K 9/4619

* cited by examiner

SOLID-STATE IMAGING APPARATUS AND ELECTRONIC EQUIPMENT

CROSS REFERENCE TO RELATED APPLICATIONS

This application is a U.S. National Phase of International Patent Application No. PCT/JP2018/006878 filed on Feb. 26, 2018, which claims priority benefit of Japanese Patent Application No. JP 2017-044882 filed in the Japan Patent Office on Mar. 9, 2017. Each of the above-referenced applications is hereby incorporated herein by reference in its entirety.

TECHNICAL FIELD

The present disclosure relates to a solid-state imaging apparatus and electronic equipment, and particularly relates to a solid-state imaging apparatus and electronic equipment that allow a reduction in power consumption.

BACKGROUND ART

A local binary pattern (LBP) is known as one of local feature amounts that are robust against variations in gray values of an image and exhibit high identification performance. The LBP is applied to various fields such as face image recognition, texture division, and real-time moving image analysis (see PTL 1).

CITATION LIST

Patent Literature

[PTL 1]
Japanese Patent Laid-Open No. 2015-35172

SUMMARY

Technical Problem

In an existing real-time recognition system, a processor performs LBP feature extraction using digital image signals obtained from an imaging element and checks with learning data to output a result of recognition.

The LBP feature extraction itself has advantages of being simple and requiring a small amount of calculation. However, in the case of an application where recognition processing is performed at high speed all the time, it has been necessary to continuously obtain image data from the imaging element at high speed, resulting in a significant amount of power consumption on the imaging element's side.

The present disclosure has been made in view of such a circumstance and can sufficiently secure the time width of a pulse signal.

Solution to Problem

A solid-state imaging apparatus according to one aspect of the present technology includes: for each pixel or each area block, a comparator circuit configured to compare a pixel signal with a reference signal temporally changing; and a data holding section configured to compare, using the reference signal, a magnitude of a pixel signal of a pixel of interest with a magnitude of each of pixel signals of neighboring pixels located in a neighborhood of the pixel of interest and hold a result of comparison of the magnitudes.

AD conversion of the pixel signal of the pixel of interest can be performed using the comparator circuit and the reference signal, and a result of the AD conversion can be held in the data holding section.

A second data holding section different from the data holding section and configured to perform AD conversion of the pixel signal of the pixel of interest in parallel with the comparison of the magnitude of the pixel signal of the pixel of interest with the magnitude of each of the pixel signals of the neighboring pixels located in the neighborhood of the pixel of interest and hold a result of the AD conversion can be further included.

Comparator circuit output signals of the neighboring pixels can be connected to the data storage section of the pixel of interest.

The comparator circuit output signals of the neighboring pixels connected to the data storage section of the pixel of interest are fewer in number than the neighboring pixels that are compared with the pixel of interest.

The neighboring pixels include adjacent pixels adjacent to the pixel of interest.

Electronic equipment according to one aspect of the present technology includes: a solid-state imaging apparatus including, for each pixel or each area block, a comparator circuit configured to compare a pixel signal with a reference signal temporally changing, and a data holding section configured to compare, using the reference signal, a magnitude of a pixel signal of a pixel of interest with a magnitude of each of pixel signals of neighboring pixels located in a neighborhood of the pixel of interest and hold a result of comparison of the magnitudes; a signal processing circuit configured to process an output signal output from the solid-state imaging apparatus; and an optical system configured to cause incident light to be incident on the solid-state imaging apparatus.

In one aspect of the present technology, for each pixel or each area block, a pixel signal is compared with a reference signal temporally changing. A magnitude of a pixel signal of a pixel of interest is compared with a magnitude of each of pixel signals of neighboring pixels located in a neighborhood of the pixel of interest using the reference signal, and a result of comparison of the magnitudes is held in a data holding section.

Advantageous Effect of Invention

According to the present technology, power consumption can be reduced.

It is noted that the effects described in the present specification are merely examples, and the effects of the present technology are not limited to the effects described in the present specification and may have additional effects.

DESCRIPTION OF EMBODIMENTS

Hereinafter, modes for carrying out the present disclosure (hereinafter referred to as embodiments) will be described. It is noted that the description will be given in the following order.
0. Overview
1. First Embodiment
2. Second Embodiment
3. Usage Example of Image Sensor
4. Example of Electronic Equipment
5. Example of Application to Mobile Body 0. Overview <About Local Binary Pattern (LBP)>

Figure 1:
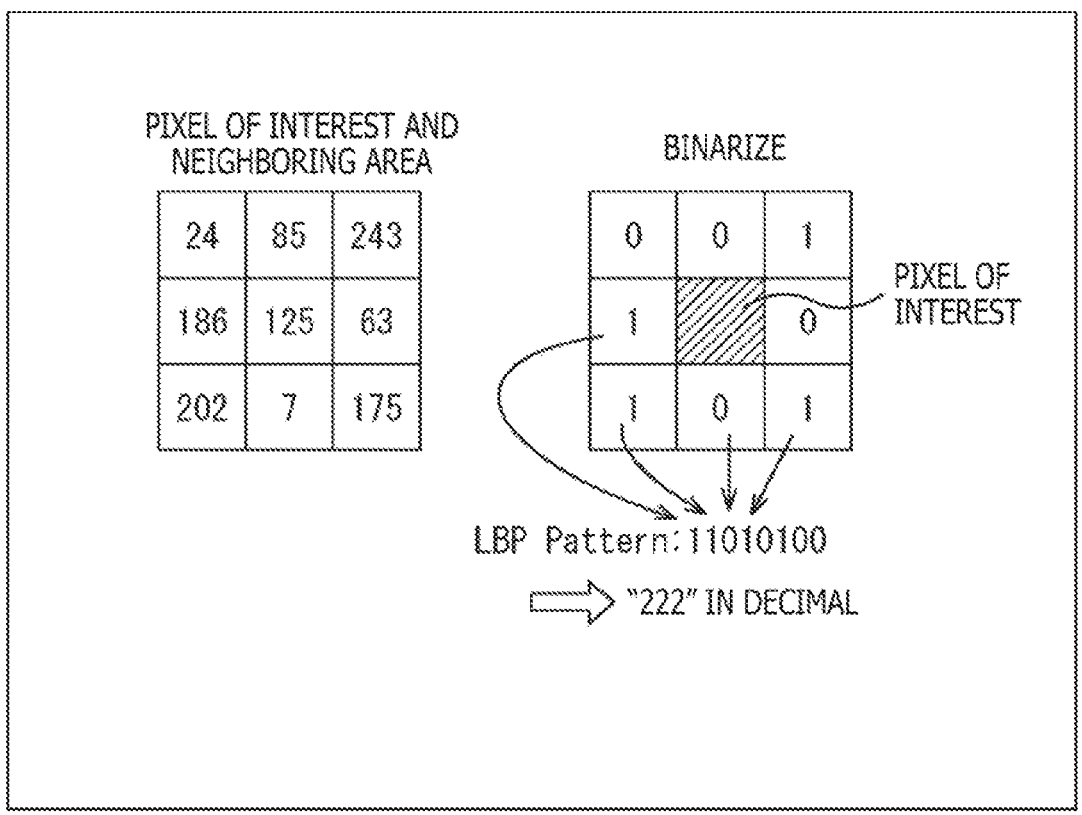
FIG. 1 is a diagram explaining characteristics of an LBP.

FIG. 1 is a diagram for explaining characteristics of the local binary pattern (LBP). FIG. 1 is a diagram depicting an example of calculation of the LBP.

A method of calculating an LBP value in a pixel of interest that is in the center will be described using, as an example, a case where pixel values are arranged as in a 3×3 array, as depicted in the example in FIG. 1. First, the pixel value 125 of the pixel of interest that is in the center is used as a threshold value. Each of the values of neighboring pixels thereof is compared with the threshold value and binarized. In a case where the value is greater than the threshold value, 1 is set. In a case where the value is smaller than the threshold value, 0 is set. Next, the binarized values are arranged in order in a clockwise direction from the neighboring pixel located in the northwest of the pixel of interest, and are regarded as a binary pattern.

In the example in FIG. 1, the LBP value for the pixel of interest is 11010100 (binary) and is represented as 222 in decimal. It is noted that although the neighboring pixels are arranged in order using the northwest neighboring pixel as the least significant bit this time, there are variations in how to select the neighboring pixels and the order of arrangement of bits.

In this manner, LBP values corresponding to respective pixels are individually calculated. Information indicating how many pixels have individual LBP values in the entire image (that is, a histogram of the LBP values) is the LBP feature amount. In the example this time, since the adjacent eight neighbors are taken as the neighboring pixels to be compared with the pixel of interest, the number of dimensions of the feature amount is eight bits, which is the 256-dimensional feature amount in decimal.

As described above, the LBP feature describes a pattern of an image on the basis of a relative relationship with surrounding pixels using the pixel value of the pixel of interest as the threshold value. This advantage is, therefore, robustness against a change due to an external factor such as superimposition of an offset over the entire image (for example, a change in a lighting environment).

In an existing real-time recognition system, a processor performs LBP feature extraction using digital image signals obtained from an imaging element and checks with learning data to output a result of recognition.

The LBP feature extraction itself has advantages of being simple and requiring a small amount of calculation. However, in the case of an application where recognition processing is performed at high speed all the time, it has been necessary to continuously obtain image data from the imaging element at high speed, resulting in a significant amount of power consumption on the imaging element's side.

Figure 2:
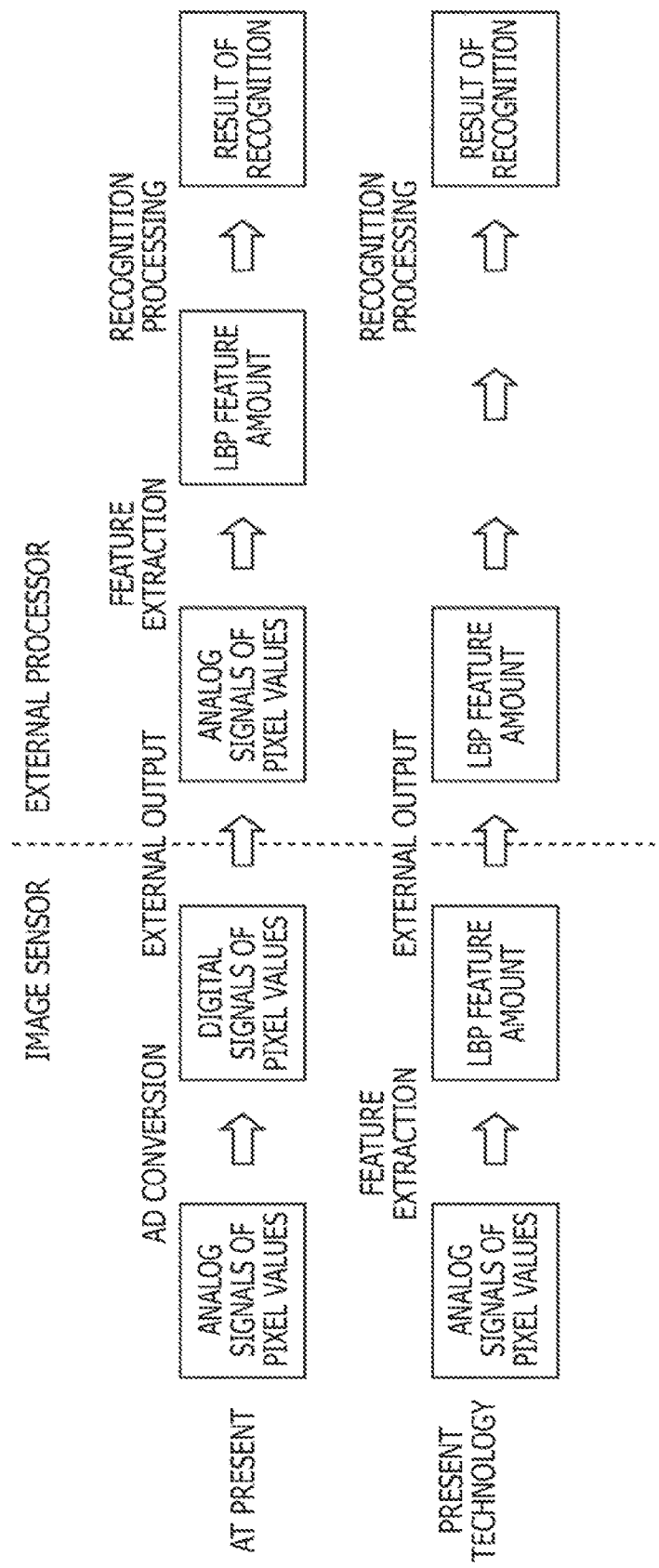
FIG. 2 is a diagram explaining a concept of the present technology.

In view of the circumstances, as depicted in FIG. 2, in the present technology, the LBP feature extraction is performed directly from analog pixel signals in the imaging element (image sensor), instead of the external processor. This omits AD conversion of the pixel signals and allows a reduction in power consumption. Further, data output from the image sensor are not image signals but the LBP feature amount itself. A reduction in the amount of data transmitted from the image sensor to the external processor can also suppress power consumption related to I/O.

For example, assuming that an 8-bit 256-dimensional LBP feature is extracted from an 8-bit full HD image, an application of the present technology is considered. In this case, the amount of output data can be reduced to 0.032% since (256 dimensions×21 bits)/(1920 pixels×1080 pixels×8 bits)×100≈0.032%.

Here, the bit width per dimension of the LBP feature is 21 with which the number of full-HD pixels can be counted without overflow.

The image sensor having the LBP feature extraction function according to the present technology is based on a pixel ADC CMOS image sensor and implemented only with a small addition of a circuit area without deteriorating its function/imaging characteristics.

First, the pixel ADC image sensor, which is the basis of the present technology, will be described as the first embodiment with reference to FIGS. 3 to 16.

1. First Embodiment

<Example of Schematic Configuration of Solid-State Imaging Apparatus>

Figure 3:
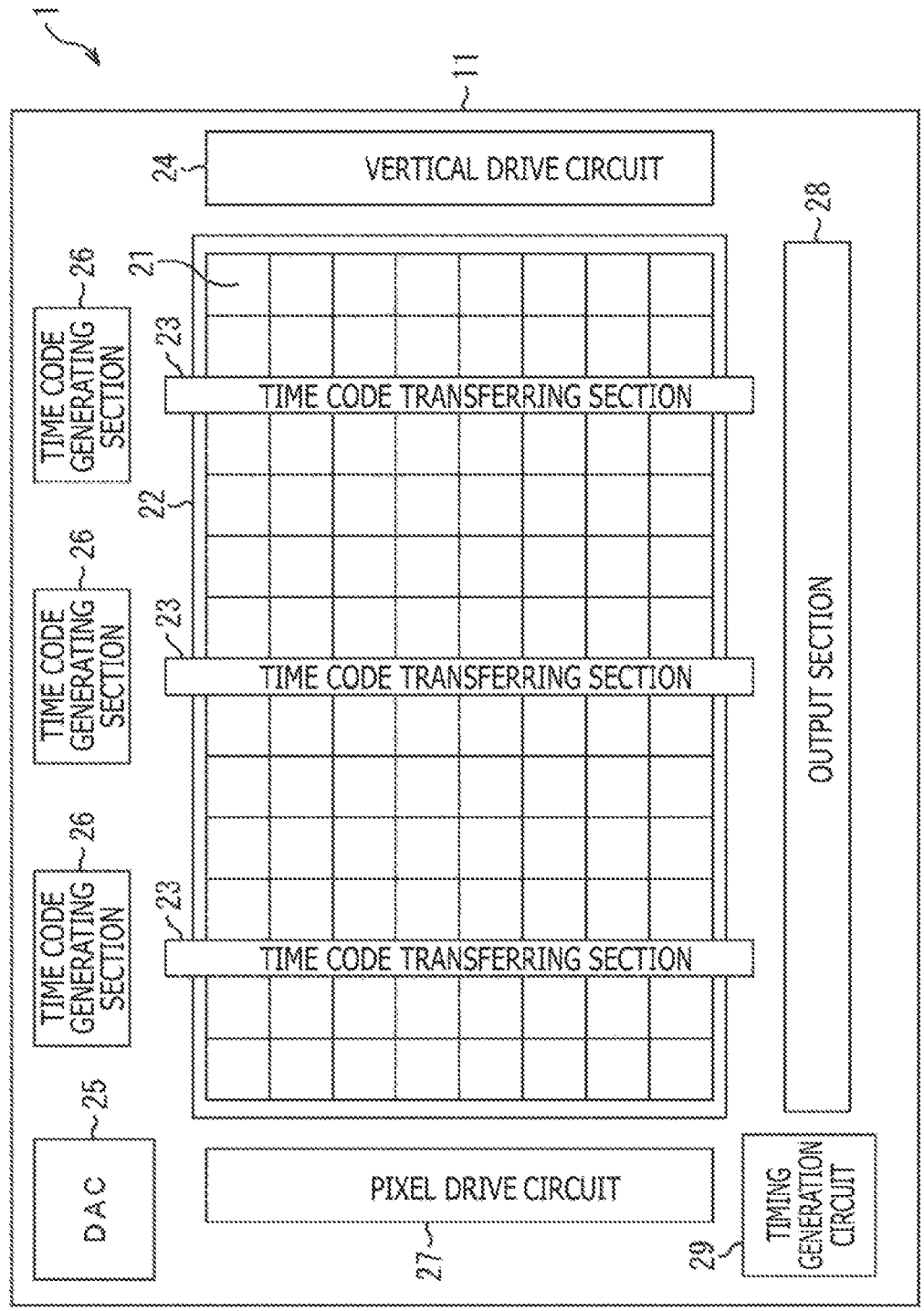
FIG. 3 is a diagram depicting a schematic configuration of a solid-state imaging apparatus according to the present disclosure.

FIG. 3 depicts a schematic configuration of a solid-state imaging apparatus according to the present technology.

A solid-state imaging apparatus 1 in FIG. 3 includes a pixel array section 22. The pixel array section 22 includes pixels 21 arranged in a two-dimensional array on a semiconductor substrate 11. The semiconductor substrate 11 uses silicon (Si) as a semiconductor, for example. The pixel array section 22 also includes time code transferring sections 23. Each time code transferring section 23 transfers a time code generated by a corresponding one of time code generating sections 26 to each pixel 21. In addition, a pixel drive circuit 24, a DAC (D/A Converter) 25, the time code generating sections 26, a vertical drive circuit 27, an output section 28, and a timing generation circuit 29 are formed around the pixel array section 22 on the semiconductor substrate 11.

Each of the pixels 21 arranged in the two-dimensional array includes a pixel circuit 41 and an ADC 42, as will be described later with reference to FIG. 2. Each pixel 21 generates an electric charge signal corresponding to the quantity of light received by a light receiving element (for example, a photodiode) in the pixel and converts the electric charge signal to a digital pixel signal SIG to output the digital pixel signal SIG.

The pixel drive circuit 24 drives the pixel circuit 41 (FIG. 4) in each pixel 21. The DAC 25 generates and supplies a reference signal (reference voltage signal) REF to each pixel 21. The reference signal REF is a slope signal whose level (voltage) monotonously decreases according to the passage of time. Each time code generating section 26 generates a time code used when each pixel 21 converts an analog pixel signal SIG into a digital signal (AD conversion) and supplies the time code to a corresponding one of the time code transferring sections 23. The plurality of time code generating sections 26 is provided for the pixel array section 22. The number of time code transferring sections 23 provided in the pixel array section 22 corresponds to the number of the time code generating sections 26. In other words, the time code generating sections 26 correspond one-to-one to the time code transferring sections 23 that transfer the time codes generated by the respective time code generating sections 26.

The vertical drive circuit 27 performs control to cause the output section 28 to output the digital pixel signals SIG generated in the pixels 21 in a predetermined order on the basis of a timing signal supplied from the timing generation circuit 29. The digital pixel signals SIG output from the pixels 21 are output from the output section 28 to the outside of the solid-state imaging apparatus 1. The output section 28 performs predetermined digital signal processing such as black level correction processing for correcting the black level and CDS (correlated double sampling) processing, as necessary. After that, the output section 28 outputs the digital pixel signals SIG to the outside.

The timing generation circuit 29 includes a timing generator and the like that generate various timing signals and supplies the generated various timing signals to the pixel drive circuit 24, the DAC 25, the vertical drive circuit 27, and the like.

The solid-state imaging apparatus 1 is configured as described above. It is noted that although, as described above, all the circuits included in the solid-state imaging apparatus 1 have been described to be formed on one semiconductor substrate 11 in FIG. 3, it is also possible to divide and arrange the circuits included in the solid-state imaging apparatus 1 on a plurality of semiconductor substrates 11, as described later.

<Example of Detailed Configuration of Pixel>

Figure 4:
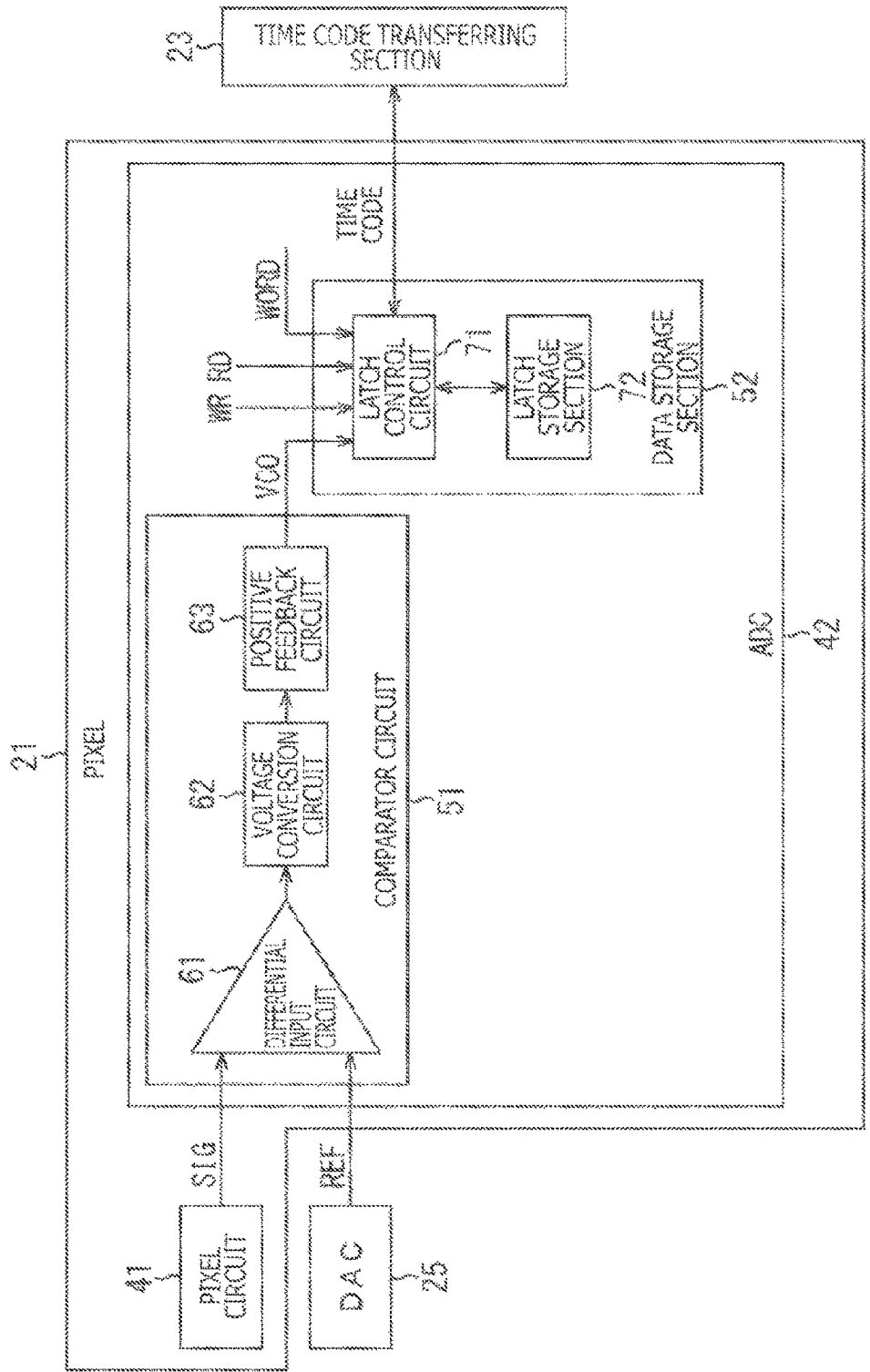
FIG. 4 is a block diagram depicting an example of a detailed configuration of a pixel.

FIG. 4 is a block diagram depicting an example of a detailed configuration of the pixel 21.

The pixel 21 includes the pixel circuit 41 and the ADC (AD converter) 42.

The pixel circuit 41 outputs an electric charge signal corresponding to the quantity of received light to the ADC 42 as an analog pixel signal SIG. The ADC 42 converts the analog pixel signal SIG supplied from the pixel circuit 41 into a digital signal.

The ADC 42 includes a comparator circuit 51 and a data storage section 52.

The comparator circuit 51 compares the reference signal REF supplied from the DAC 25 with the pixel signal SIG and outputs an output signal VCO as a comparison result signal representing a result of comparison. The comparator circuit 51 inverts the output signal VCO when the reference signal REF and the pixel signal SIG have become the same (voltage).

The comparator circuit 51 includes a differential input circuit 61, a voltage conversion circuit 62, and a positive feedback (PFB) circuit 63. The details will be described later with reference to FIG. 5.

The output signal VCO is input into the data storage section 52 from the comparator circuit 51. Additionally, a WR signal, an RD signal, and a WORD signal are supplied from the vertical drive circuit 27 to the data storage section 52. The WR signal indicates an operation of writing the pixel signal. The RD signal indicates an operation of reading the pixel signal. The WORD signal controls the timing of reading the pixel 21 during the operation of reading the pixel signal. In addition, the time code generated by the time code generating section 26 is also supplied via the corresponding time code transferring section 23.

The data storage section 52 includes a latch control circuit 71 and a latch storage section 72. The latch control circuit 71 controls an operation of writing the time code and an operation of reading the time code on the basis of the WR signal and the RD signal. The latch storage section 72 stores the time code.

In the operation of writing the time code, the latch control circuit 71 causes the latch storage section 72 to store the time code supplied from the time code transferring section 23 while the Hi (High) output signal VCO is input from the comparator circuit 51. The time code is updated every unit time. Then, when the reference signal REF and the pixel signal SIG have become the same (voltage) and the output signal VCO supplied from the comparator circuit 51 has been inverted to Lo (Low), the latch control circuit 71 stops writing (updating) the supplied time code and causes the latch storage section 72 to hold the time code last stored in the latch storage section 72. The time code stored in the latch storage section 72 indicates the time when the pixel signal SIG and the reference signal REF have become equal to each other. In other words, the time code stored in the latch storage section 72 indicates data indicating that the pixel signal SIG has been the reference voltage at that time, that is, a digitized value of the quantity of light.

After the sweep of the reference signal REF ends and the time code is stored in the latch storage section 72 of each of all the pixels 21 in the pixel array section 22, the operation of the pixels 21 is changed from the writing operation to the reading operation.

In the operation of reading the time code, when the reading timing comes to the corresponding pixel 21, the latch control circuit 71 outputs the time code (digital pixel signal SIG) stored in the latch storage section 72 to the time code transferring section 23 on the basis of the WORD signal that controls the reading timing. The time code transferring section 23 sequentially transfers supplied time codes in the column direction (vertical direction) and supplies the time codes to the output section 28.

Hereinafter, digitized pixel data indicating that the pixel signal SIG, which is an inverted time code at the time of inversion of the output signal VCO read from the latch storage section 72 in the operation of reading the time code, has been the reference voltage at that time will also be referred to as AD-converted pixel data in order to be distinguished from the time code written to the latch storage section 72 in the operation of writing the time code.

<Example of Configuration of Comparator Circuit>

Figure 5:
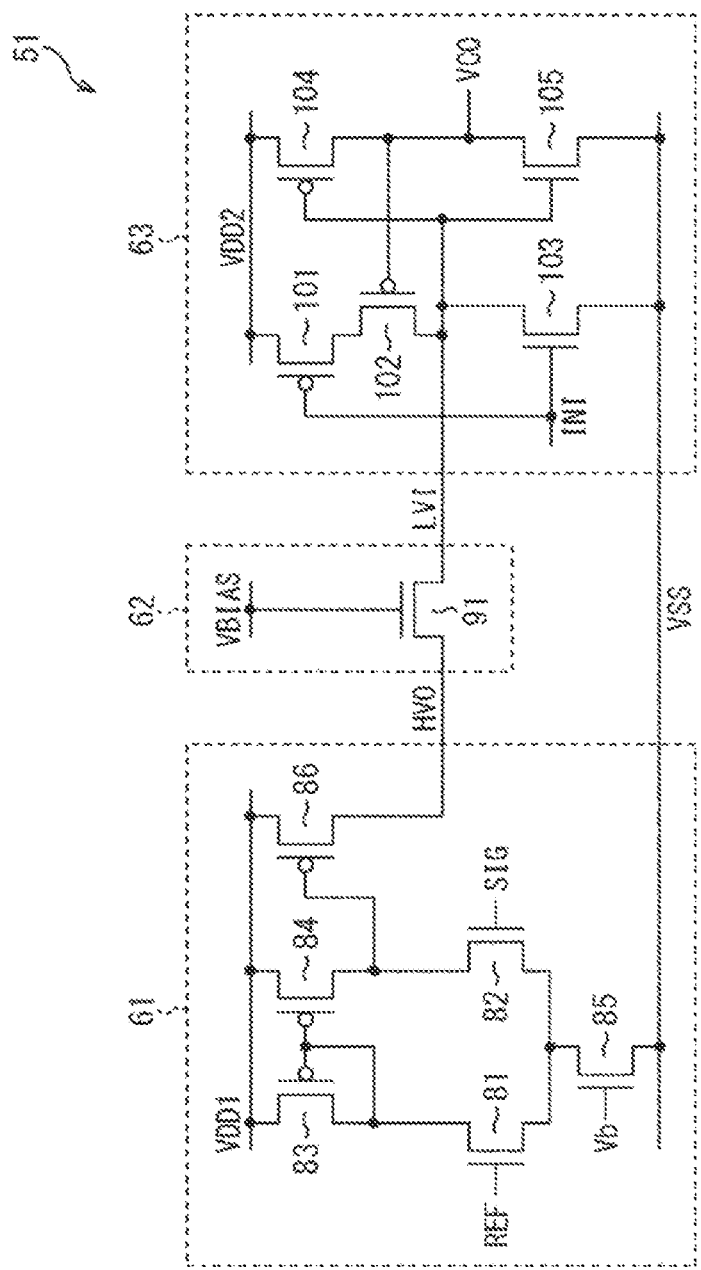
FIG. 5 is a diagram depicting transition of each signal during an operation of a comparator circuit.

FIG. 5 is a circuit diagram depicting a detailed configuration of the differential input circuit 61, the voltage conversion circuit 62, and the positive feedback circuit 63 that are included in the comparator circuit 51.

The differential input circuit 61 compares the pixel signal SIG output from the pixel circuit 41 in the pixel 21 with the reference signal REF output from the DAC 25. When the pixel signal SIG is higher than the reference signal REF, the differential input circuit 61 outputs a predetermined signal (current).

The differential input circuit 61 includes transistors 81 and 82 as a differential pair, transistors 83 and 84, a transistor 85, and a transistor 86. The transistors 83 and 84 are included in a current mirror. The transistor 85 serves as a constant current source for supplying a current IB according to an input bias current Vb. The transistor 86 outputs an output signal HVO of the differential input circuit 61.

The transistors 81, 82, and 85 include NMOS (negative channel MOS) transistors, while the transistors 83, 84, and 86 include PMOS (positive channel MOS) transistors.

The reference signal REF output from the DAC 25 is input into the gate of the transistor 81 among the transistors 81 and 82 as a differential pair. The pixel signal SIG output from the pixel circuit 41 in the pixel 21 is input into the gate of the transistor 82. The sources of the transistors 81 and 82 are connected to the drain of the transistor 85. The source of the transistor 85 is connected to a predetermined voltage VSS (VSS<VDD2<VDD1).

The drain of the transistor 81 is connected to the gates of the transistors 83 and 84, which are included in the current mirror circuit, and the drain of the transistor 83. The drain of the transistor 82 is connected to the drain of the transistor 84 and the gate of the transistor 86. The sources of the transistors 83, 84 and 86 are connected to a first power supply voltage VDD1.

The voltage conversion circuit 62 includes an NMOS transistor 91, for example. The drain of the transistor 91 is connected to the drain of the transistor 86 of the differential input circuit 61. The source of the transistor 91 is connected to a predetermined connection point in the positive feedback circuit 63. The gate of the transistor 86 is connected to a bias voltage VBIAS.

The transistors 81 to 86 included in the differential input circuit 61 are circuits that operate at a high voltage up to the first power supply voltage VDD1. The positive feedback circuit 63 is a circuit that operates at a second power supply voltage VDD2 lower than the first power supply voltage VDD1. The voltage conversion circuit 62 converts the output signal HVO input from the differential input circuit 61 into a low-voltage signal (converted signal) LVI with which the positive feedback circuit 63 can operate, and supplies the signal to the positive feedback circuit 63.

The bias voltage VBIAS needs only be a voltage that makes a conversion into a voltage that does not destroy each of transistors 101 to 105 of the positive feedback circuit 63 operating at a constant voltage. For example, the bias voltage VBIAS can be the same voltage as the second power supply voltage VDD2 of the positive feedback circuit 63 (VBIAS=VDD2).

The positive feedback circuit 63 outputs a comparison result signal, which is inverted when the pixel signal SIG is higher than the reference signal REF, on the basis of the converted signal LVI obtained by converting the output signal HVO from the differential input circuit 61 into a signal corresponding to the second power supply voltage VDD2. In addition, the positive feedback circuit 63 also accelerates the transition speed when the output signal VCO output as the comparison result signal is inverted.

The positive feedback circuit 63 includes the five transistors 101 to 105. Here, the transistors 101, 102, and 104 include PMOS transistors, while the transistors 103 and 105 include NMOS transistors.

The source of the transistor 91, which is the output terminal of the voltage conversion circuit 62, is connected to the drains of the transistors 102 and 103 and the gates of the transistors 104 and 105. The sources of the transistors 101 and 104 are connected to the second power supply voltage VDD2. The drain of the transistor 101 is connected to the source of the transistor 102. The gate of the transistor 102 is connected to the drains of the transistors 104 and 105, which are the output terminals of the positive feedback circuit 63. The sources of the transistors 103 and 105 are connected to the predetermined voltage VSS. An initialization signal INI is supplied to the gates of the transistors 101 and 103.

The transistors 104 and 105 are included in an inverter circuit. A connection point between the drains thereof is the output terminal from which the comparator circuit 51 outputs the output signal VCO.

Figure 6:
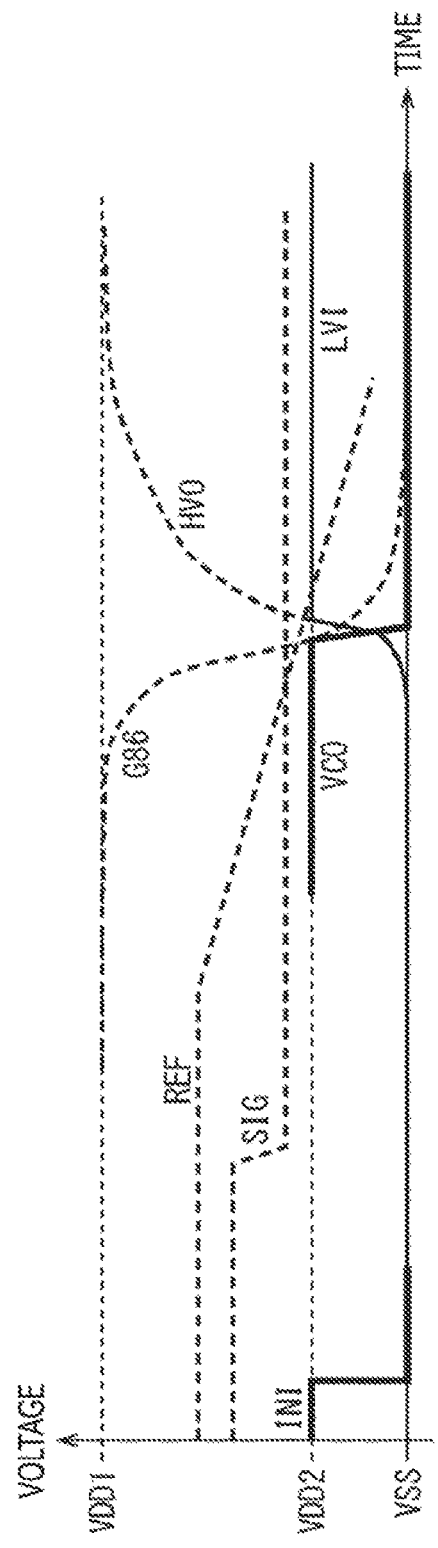
FIG. 6 is a timing chart explaining an operation of the pixel.

The operation of the comparator circuit 51 configured as described above will be described. FIG. 6 depicts the transition of each signal during the operation of the comparator circuit 51. It is noted that "G86" in FIG. 6 represents the gate potential of the transistor 86.

First, the reference signal REF is set to a voltage higher than the pixel signals SIG of all the pixels 21, while the initialization signal INI is set to Hi and the comparator circuit 51 is initialized.

More specifically, the reference signal REF is applied to the gate of the transistor 81, while the pixel signal SIG is applied to the gate of the transistor 82. While the voltage of the reference signal REF is higher than the voltage of the pixel signal SIG, most of the current output from the transistor 85 serving as the current source flows to the diode-connected transistor 83 via the transistor 81. The channel resistance of the transistor 84 including the gate common to the transistor 83 becomes sufficiently low and keeps the gate of the transistor 86 approximately at the level of the first power supply voltage VDD1, and the transistor 86 is cut off. Therefore, even if the transistor 91 of the voltage conversion circuit 62 is electrically continuous, the positive feedback circuit 63 as a charging circuit does not charge the converted signal LVI. On the other hand, since the Hi signal is supplied as the initialization signal INI, the transistor 103 becomes electrically continuous and the positive feedback circuit 63 discharges the converted signal LVI. In addition, since the transistor 101 is cut off, the positive feedback circuit 63 does not charge the converted signal LVI via the transistor 102. As a result, the converted signal LVI is discharged to the predetermined voltage VSS level. The positive feedback circuit 63 outputs the Hi output signal VCO by the transistors 104 and 105 included in the inverter and the comparator circuit 51 is initialized.

After the initialization, the initialization signal INI is turned to Lo and the sweep of the reference signal REF starts.

During the period in which the reference signal REF is higher in voltage than the pixel signal SIG, the transistor 86 is cut off since the transistor 86 is turned off, and the transistor 102 is also turned off and cut off since the output signal VCO is a Hi signal. The transistor 103 is also cut off since the initialization signal INI is Lo. The converted signal LVI keeps the predetermined voltage VSS in the high impedance state, and the Hi output signal VCO is output.

When the reference signal REF becomes lower than the pixel signal SIG, the output current of the transistor 85 of the current source does not flow through the transistor 81. The gate potentials of the transistors 83 and 84 rise, making the channel resistance of the transistor 84 higher. The current flowing therein via the transistor 82 causes a voltage drop, which decreases the gate potential of the transistor 86 and makes the transistor 91 electrically continuous. The output signal HVO output from the transistor 86 is converted into the converted signal LVI by the transistor 91 of the voltage conversion circuit 62 and supplied to the positive feedback circuit 63. The positive feedback circuit 63 as the charging circuit charges the converted signal LVI to bring the potential closer to the second power supply voltage VDD2 from the low voltage VSS.

Then, when the voltage of the converted signal LVI exceeds the threshold voltage of the inverter including the transistors 104 and 105, the output signal VCO becomes Lo and the transistor 102 becomes electrically continuous. The transistor 101 is also electrically continuous since the Lo initialization signal INI is applied. Thus, the positive feedback circuit 63 rapidly charges the converted signal LVI via the transistors 101 and 102 to swiftly increase the potential to the second power supply voltage VDD2.

Since the bias voltage VBIAS is applied to the gate of the transistor 91 of the voltage conversion circuit 62, the transistor 91 is cut off when the voltage of the converted signal LVI reaches a voltage value decreased from the bias voltage VBIAS by a transistor threshold value. Even if the transistor 86 remains electrically continuous, the converted signal LVI is not charged any further and the voltage conversion circuit 62 also functions as a voltage clamp circuit.

The charge of the converted signal LVI due to the conduction of the transistor 102 originally starts when the converted signal LVI rises to the inverter threshold value, and is a positive feedback operation that accelerates this behavior. Since there are a significant number of circuits simultaneously operating in parallel in the solid-state imaging apparatus 1, the current per circuit is set to extremely small in the transistor 85, which is the current source of the differential input circuit 61. Further, the reference signal REF is swept extremely slowly since the voltage that changes in the unit time at which the time code switches is an LSB step of the AD conversion. Therefore, a change in the gate potential of the transistor 86 is also slow and a change in the output current of the transistor 86 driven thereby is also slow. However, the output signal VCO can transition sufficiently rapidly through application of positive feedback from a rear stage to the converted signal LVI charged with the output current. Desirably, the transition duration of the output signal VCO is a fraction of the unit time of the time code and is typically 1 ns or less. The comparator circuit 51 according to the present disclosure can achieve this output transition duration only by setting a small current of, for example, 0.1 uA in the transistor 85, which is the current source.

<Example of Detailed Configuration of Pixel Circuit>

The detailed configuration of the pixel circuit 41 will be described with reference to FIG. 7.

Figure 7:
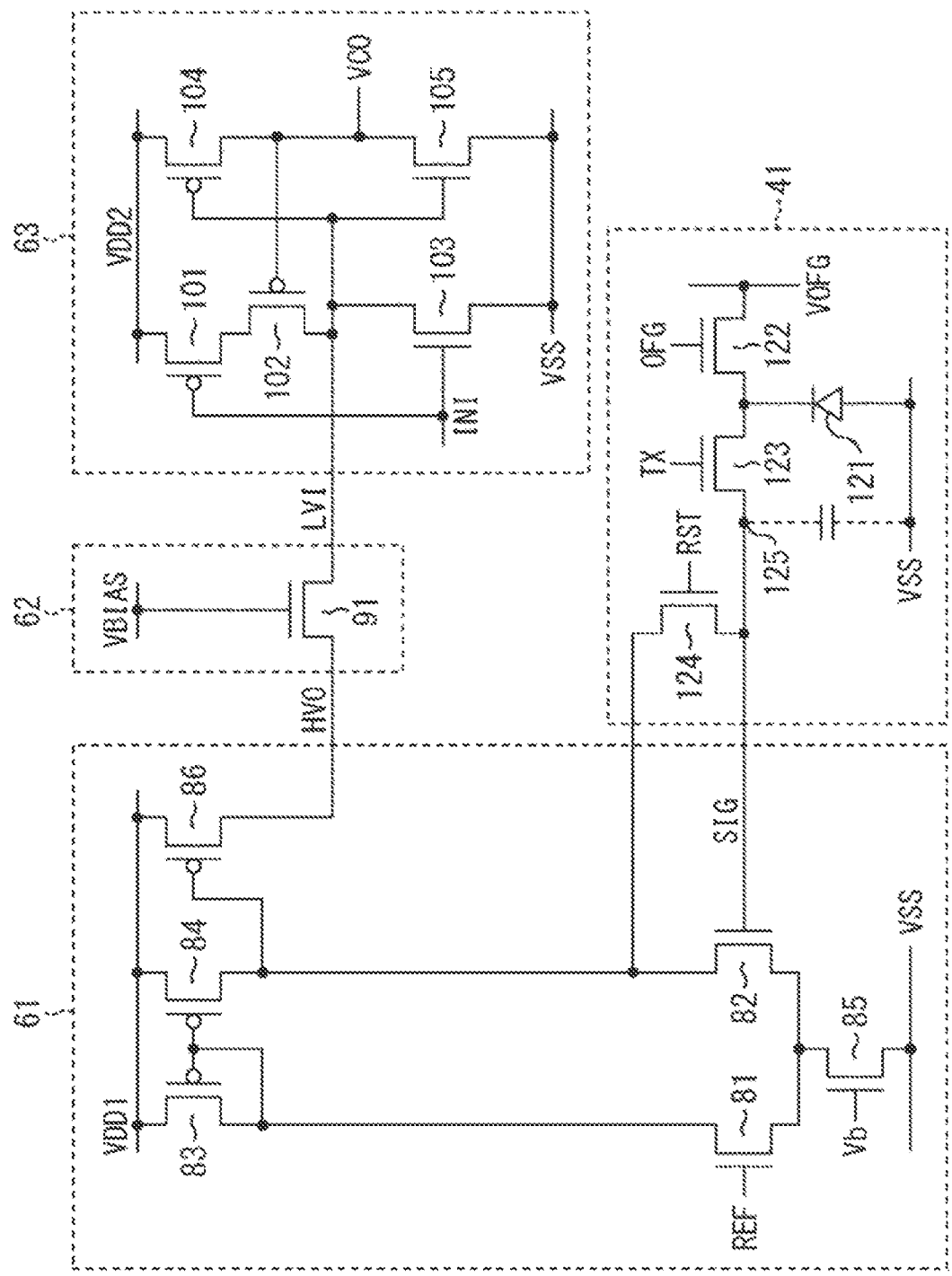
FIG. 7 is a diagram explaining a detailed configuration of a pixel circuit.

FIG. 7 is a circuit diagram depicting the details of the pixel circuit 41 added to the comparator circuit 51 depicted in FIG. 5.

The pixel circuit 41 includes a photodiode (PD) 121 as a photoelectric conversion element, a discharge transistor 122, a transfer transistor 123, a reset transistor 124, and an FD (floating diffusion layer) 125.

The discharge transistor 122 is used in a case where the exposure period is adjusted. Specifically, turning the discharge transistor 122 on when it is desired to start the exposure period at an arbitrary timing discharges the electric charges accumulated in the photodiode 121 until then. Therefore, the exposure period starts after the discharge transistor 122 is turned off.

The transfer transistor 123 transfers the electric charges generated by the photodiode 121 to the FD 125. The reset transistor 124 resets the electric charges held in the FD 125. The FD 125 is connected to the gate of the transistor 82 of the differential input circuit 61. Thus, the transistor 82 of the differential input circuit 61 also functions as an amplification transistor of the pixel circuit 41.

The source of the reset transistor 124 is connected to the gate of the transistor 82 of the differential input circuit 61 and the FD 125. The drain of the reset transistor 124 is connected to the drain of the transistor 82. Therefore, there is no fixed reset voltage for resetting the electric charges in the FD 125. This is because the reset voltage for resetting the FD 125 can be arbitrarily set using the reference signal REF by controlling the circuit state of the differential input circuit 61.

<Timing Chart of Pixel Section>

Figure 8:
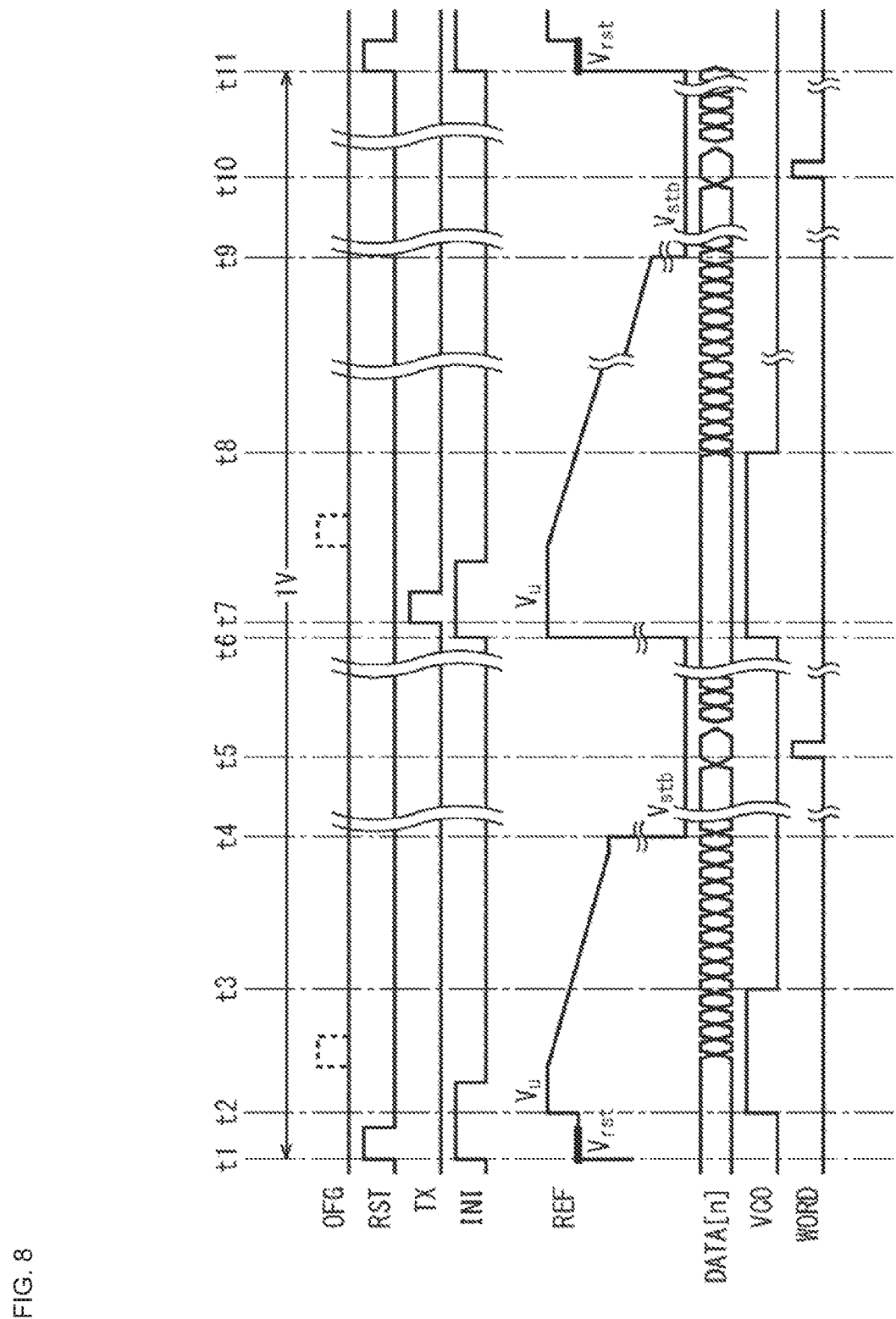
FIG. 8 is a timing chart explaining an operation of the pixel.

The operation of the pixel 21 depicted in FIG. 7 will be described with reference to a timing chart in FIG. 8.

First, at time t1, the reference signal REF, which has been set to a standby voltage Vstb, is set to a reset voltage Vrst for resetting the electric charges in the FD 125 and the reset transistor 124 is turned on. This resets the electric charges in the FD 125. In addition, at time t1, the initialization signal INI supplied to the gates of the transistors 101 and 103 of the positive feedback circuit 63 is set to Hi and the positive feedback circuit 63 is set to the initial state.

At time t2, the reference signal REF is raised to a predetermined voltage Vu and comparison of the reference signal REF with the pixel signal SIG (the sweep of the reference signal REF) starts. At this point in time, since the reference signal REF is higher than the pixel signal SIG, the output signal VCO is Hi.

At time t3 when the reference signal REF and the pixel signal SIG are determined to have become the same, the output signal VCO is inverted (transitioned to Low). When the output signal VCO has been inverted, the positive feedback circuit 63 accelerates the inversion of the output signal VCO as described above. In addition, the data storage section 52 stores time data (N-bit DATA [1] to DATA [N]) at the time when the output signal VCO has been inverted.

At time t4, which is the time when the signal writing period ends and is also the start time of the signal reading period, the voltage of the reference signal REF supplied to the gate of the transistor 81 of the comparator circuit 51 is decreased to the level (standby voltage Vstb) at which the transistor 81 is turned off. This suppresses the current consumed by the comparator circuit 51 during the signal reading period.

At time t5, the WORD signal for controlling the reading timing becomes Hi and an N-bit latch signal Col[n] (n=1 to N) (not depicted) is output from the latch control circuit 71 of the data storage section 52. The data obtained here is P-phase data of a reset level when the CDS (Correlated Double Sampling) processing is performed.

At time t6, the reference signal REF is raised to the predetermined voltage Vu while the initialization signal INI supplied to the gates of the transistors 101 and 103 is set to Hi and the positive feedback circuit 63 is set to the initial state again.

At time t7, the transfer transistor 123 of the pixel circuit 41 is turned on by a Hi transfer signal TX, and the electric charges generated by the photodiode 121 are transferred to the FD 125.

After the initialization signal INI is returned to Low, comparison of the reference signal REF with the pixel signal SIG (the sweep of the reference signal REF) starts. At this point in time, since the reference signal REF is higher than the pixel signal SIG, the output signal VCO is Hi.

Then, at time t8 when the reference signal REF and the pixel signal SIG are determined to have become the same, the output signal VCO is inverted (transitioned to Low). When the output signal VCO has been inverted, the positive feedback circuit 63 accelerates the inversion of the output signal VCO. In addition, the data storage section 52 also stores time data (N-bit DATA [1] to DATA [N]) at the time when the output signal VCO has been inverted.

At time t9, which is the time when the signal writing period ends and is also the start time of the signal reading period, the voltage of the reference signal REF supplied to the gate of the transistor 81 of the comparator circuit 51 is decreased to the level (standby voltage Vstb) at which the transistor 81 is turned off. This suppresses the current consumed by the comparator circuit 51 during the signal reading period.

At time t10, the WORD signal for controlling the reading timing becomes Hi and an N-bit latch signal Col[n] (n=1 to N) (not depicted) is output from the latch control circuit 71 of the data storage section 52. The data obtained here is D-phase data of a signal level when the CDS processing is performed. The state at time t11 is the same as the state at time t1 described above and the next 1 V (one vertical scanning period) is driven at time t11.

According to the above-described driving of the pixel 21, the P-phase data (reset level) is first obtained and then read. Next, the D-phase data (signal level) is obtained and read.

By the above-described operation, each pixel 21 of the pixel array section 22 of the solid-state imaging apparatus 1 can perform global shutter operation by which all the pixels are reset simultaneously and all the pixels are exposed simultaneously. Since all the pixels can be exposed and read simultaneously, it is not necessary to provide a holding section that is generally provided in each pixel and holds the electric charges until the electric charges are read. In addition, the configuration of the pixel 21 does not need a selection transistor or the like for selecting a pixel that outputs the pixel signal SIG. The selection transistor has been necessary in a column-parallel-read-type solid-state imaging apparatus.

The discharge transistor 122 is controlled so as to be off all the time in the driving of the pixel 21 described with reference to FIG. 8. As indicated by a broken line in FIG. 8, however, it is also possible to set an arbitrary exposure period by setting a discharge signal OFG to Hi at a desired time, temporarily turning the discharge transistor 122 on, and then turning the discharge transistor 122 off.

<Example of Configurations of Time Code Transferring Section and Data Storage Section>

Figure 9:
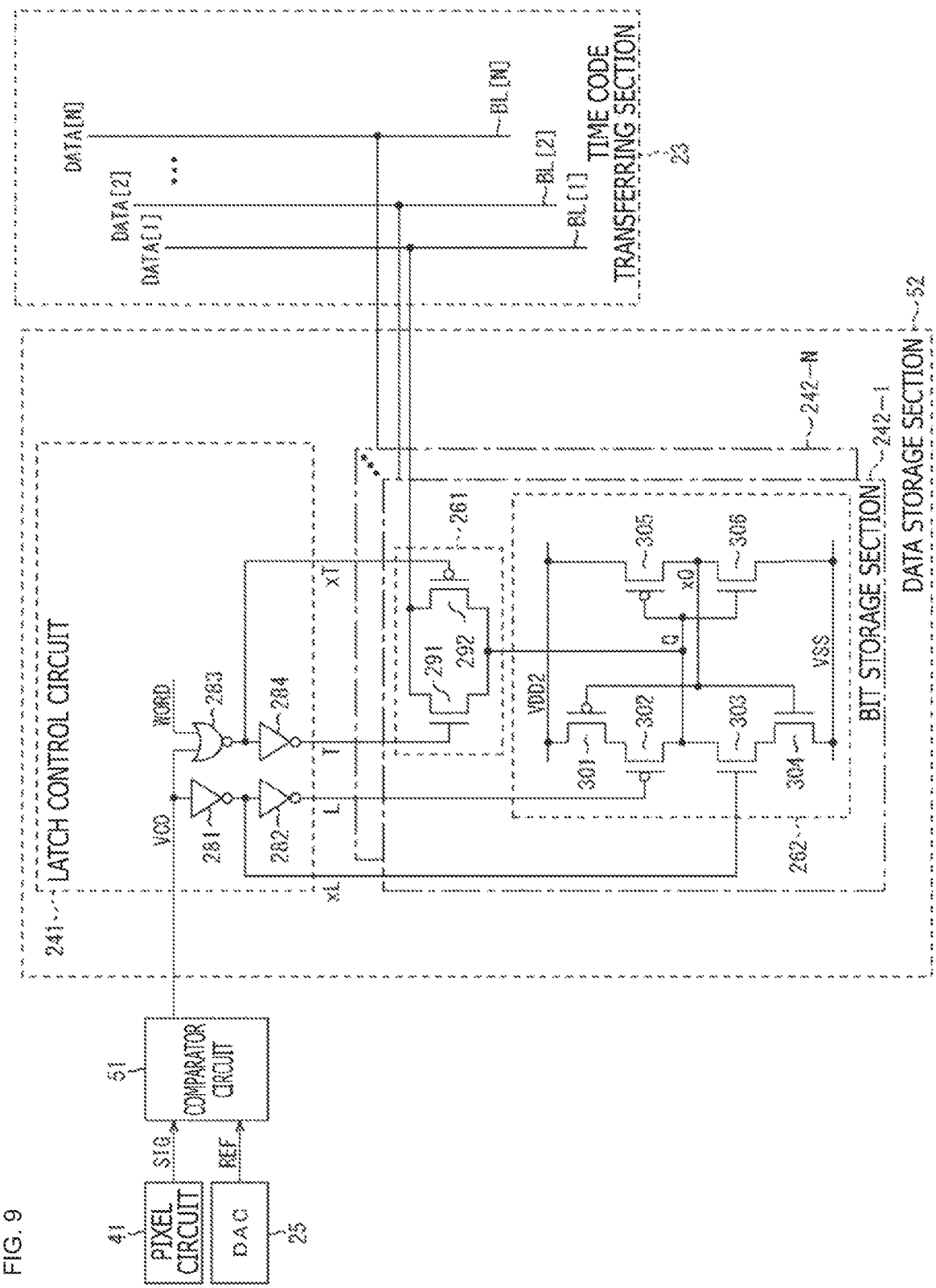
FIG. 9 is a circuit diagram depicting a first example of configurations of a time code transferring section and a data storage section.

FIG. 9 is a circuit diagram depicting a first example of configurations of the time code transferring section 23 and the data storage section 52.

In the example of the configurations in FIG. 9, the data storage section 52 includes one latch control circuit 241 and N bit storage sections 242-1 to 242-N. In the example of the configurations in FIG. 9, one latch control circuit 241 supplies the output signal VCO and the WORD signal to the N bit storage sections 242-1 to 242-N. Each of the bit storage sections 242-1 to 242-N includes a transfer gate 261 and a latch storage section 262.

In other words, in the example of the configurations in FIG. 9, the latch control circuit 241 is provided outside the bit storage sections 242-1 to 242-N and shared among the bit storage sections 242-1 to 242-N. The latch control circuit 241 corresponds to the latch control circuit 71 in FIG. 3. The bit storage sections 242-1 to 242-N correspond to the latch storage section 72 in FIG. 3.

The latch control circuit 241 includes two inverters 281 and 282, a NOR circuit 283, and an inverter 284. The inverters 281 and 282 are connected in series. The NOR circuit 283 and the inverter 284 are connected in series.

The transfer gate 261 of the bit storage section 242-n includes two transistors 291 and 292, which include an NMOS transistor and a PMOS transistor, respectively.

The latch storage section 262 of the bit storage section 242-n includes a static latch circuit including transistors 301 to 306. The transistors 301, 302, and 305 include PMOS transistors. The transistors 303, 304, and 306 include NMOS transistors.

The output signal VCO, which is the output from the comparator circuit 51, is input into the inverter 281 and the NOR circuit 283. The WORD signal is supplied to the other input of the NOR circuit 283. The output of the inverter 281 is supplied to the inverter 282 and the gate of the transistor 303 of the latch storage section 262. The output of the inverter 282 is supplied to the gate of the transistor 302 of the latch storage section 262. In addition, the output of the NOR circuit 283 is supplied to the inverter 284 and the gate of the transistor 292 of the transfer gate 261. The output of the inverter 284 is supplied to the gate of the transistor 291 of the transfer gate 261.

In the operation of writing the time code, the WORD signal becomes Lo at all the pixels. The transfer gate 261 becomes electrically continuous when the output signal VCO is Hi. The transfer gate 261 is cut off when the output signal VCO is Lo. The feedback (an output xQ to an input Q) of the latch storage section 262 is cut off when the output signal VCO is Hi. The feedback of the latch storage section 262 becomes electrically continuous when the output signal VCO is Lo. Therefore, when the output signal VCO is Hi, the latch storage section 262 is in the state of writing the time code of the nth bit (transparent). When the output signal VCO is Lo, the latch storage section 262 is in the state of holding the written time code (latch state).

In the operation of reading the time code, the WORD signal is supplied only to the latch control circuit 241 of the pixel 21 to be read. Since the output signal VCO is Lo, the transfer gate 261 becomes electrically continuous only when the Hi WORD signal is input. The time code held in the latch storage section 212 is output to the time code transferring section 23.

<Another Example of Configurations of Time Code Transferring Section and Data Storage Section>

Figure 10:
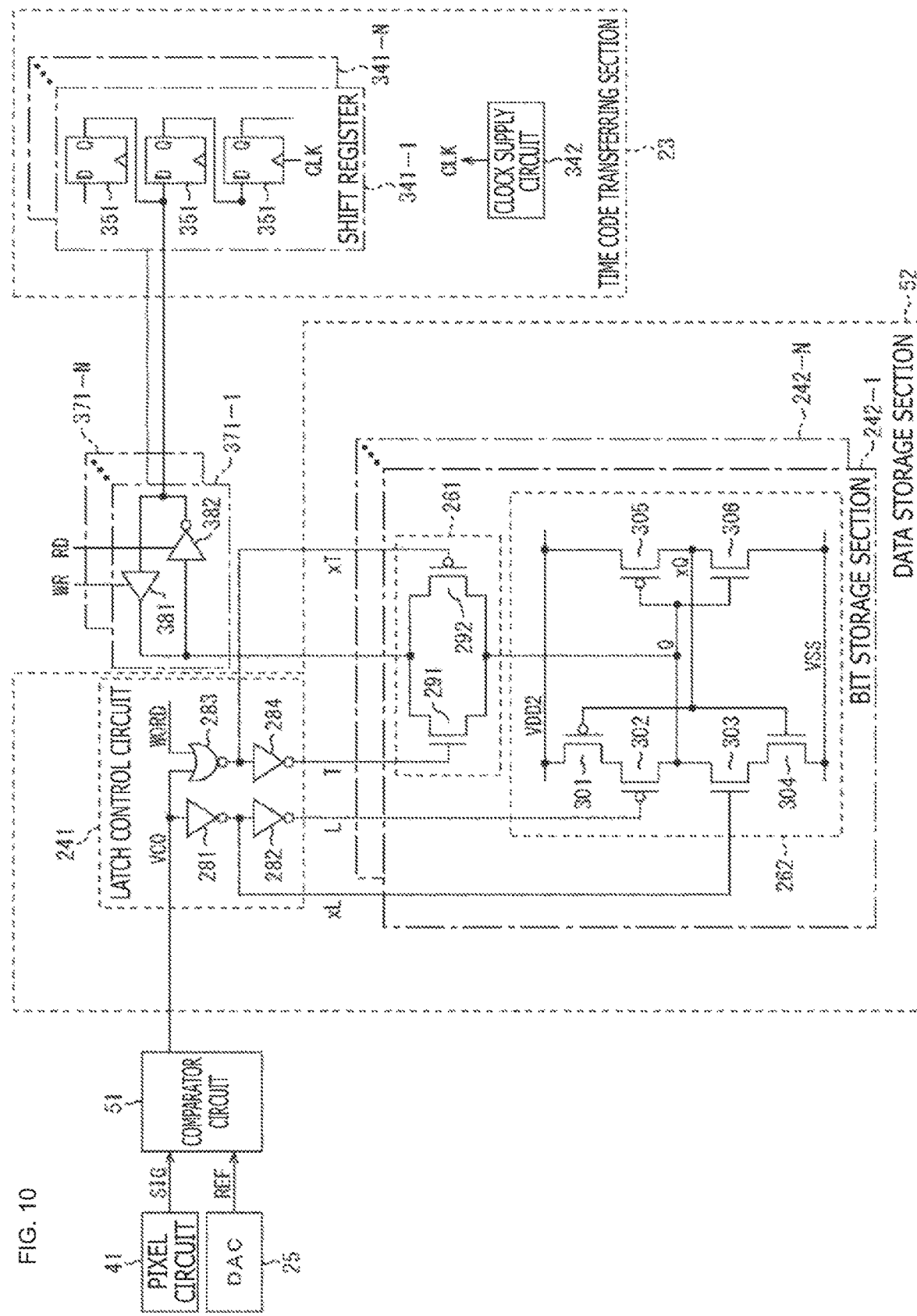
FIG. 10 is a circuit diagram depicting a second example of the configurations of the time code transferring section and the data storage section.

FIG. 10 is a circuit diagram depicting a second example of the configurations of the time code transferring section 23 and the data storage section 52.

In the example of the configurations in FIG. 10, the time code transferring section 23 includes N shift registers 341-1 to 341-N and a clock supply circuit 342. The N shift registers 341-1 to 341-N correspond to the N-bit time code DATA [1] to DATA [N]. Each of the N shift registers 341-1 to 341-N includes a plurality of D-F/Fs (D-flip flops) 351. The clock supply circuit 342 supplies a clock signal CLK to a clock input of each D-F/F 351 of the shift register 341.

The data storage section 52 includes the latch control circuit 241 and the N bit storage sections 242-1 to 242-N, which are similar to the first example of the configurations depicted in FIG. 9. Further, N bidirectional buffer circuits 371-1 to 371-N are newly added between the time code transferring section 23 and the data storage section 52 in the example of the configurations in FIG. 10.

The N bidirectional buffer circuits 371-1 to 371-N are provided corresponding one-to-one to the N shift registers 341-1 to 341-N of the time code transferring section 23. Each bidirectional buffer circuit 371 is connected to one D-F/F 351 in the corresponding shift register 341.

A buffer circuit 381 of the bidirectional buffer circuit 371-n is supplied with a writing control signal WR that becomes Hi in the operation of writing the time code. An inverter circuit 382 is supplied with a reading control signal RD that becomes Hi in the operation of reading the time code. The bidirectional buffer circuit 371-n switches the operation of writing the time code and the operation of reading the time code to the bit storage section 242-n on the basis of the writing control signal WR and the reading control signal RD.

The bit storage sections 242-1 to 242-N have similar configurations to the second example of the configurations depicted in FIG. 9.

During the AD conversion period in which the reference signal REF is swept, the N shift registers 341 of the time code transferring section 23 each transfer the time code supplied from the time code generating section 26 on the basis of a shift clock using the unit time of the time code as a clock cycle.

In the operation of writing the time code, the Hi writing control signal WR and the Lo reading control signal RD are supplied to the bidirectional buffer circuit 371. The bidirectional buffer circuit 371 supplies the time code supplied from the predetermined D-F/F 351 of the shift register 341 to the bit storage section 242 via the transfer gate 261. The bit storage section 242 stores the supplied time code.

In the next operation of reading the time code, the time code stored in the bit storage section 242 is supplied to the predetermined D-F/F 351 of the shift register 341 of the time code transferring section 23 via the bidirectional buffer circuit 371. The shift register 341 sequentially transfers the time data supplied to the D-F/F 351 in each stage to the output section 28 to output the time data.

More specifically, each D-F/F 351 of the shift register 341 employs a configuration so as to be made into the high impedance state (hereinafter referred to as a Hi-Z state) when the clock signal CLK supplied to the clock input is either Hi or Lo. For example, with the configuration of the D-F/F 351 described later with reference to FIG. 11, the D-F/F 351 is in the Hi-Z state when the clock signal CLK is Lo.

During a period in which each D-F/F 351 of the shift register 341 is in the Hi-Z state, the Hi reading control signal RD is supplied to the bidirectional buffer circuit 371, and at the same time, the WORD signal becomes Hi. The time code stored in the bit storage section 242 is supplied to the predetermined D-F/F 351 of the shift register 341 of the time code transferring section 23 via the bidirectional buffer circuit 371.

After the reading control signal RD is turned back to Lo, the shift clock is supplied to each D-F/F 351 of the shift register 341. The shift register 341 sequentially transfers the time data supplied to the D-F/F 351 in each stage to the output section 28 to output the time data.

<Example of Configuration of D-F/F>

Figure 11:
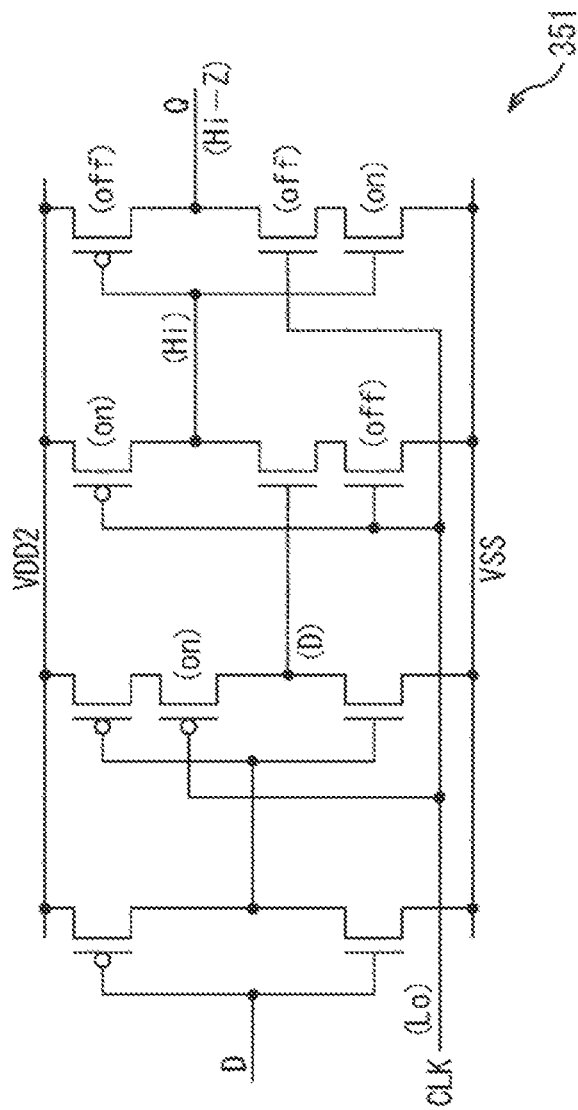
FIG. 11 is a diagram depicting an example of a configuration of a D-F/F of a shift register.

FIG. 11 depicts an example of a configuration of the D-F/F 351 of the shift register 341.

In FIG. 11, characters such as on and off in parentheses ( ) near each transistor and signal line indicate a potential state of each transistor and signal line when the Lo clock signal CLK is input into the clock input.

As depicted in FIG. 11, in a case where the Lo clock signal CLK has been input into the D-F/F 351, the D-F/F 351 is in the Hi-Z state.

<Example of Configuration of Bidirectional Buffer Circuit>

Figure 12:
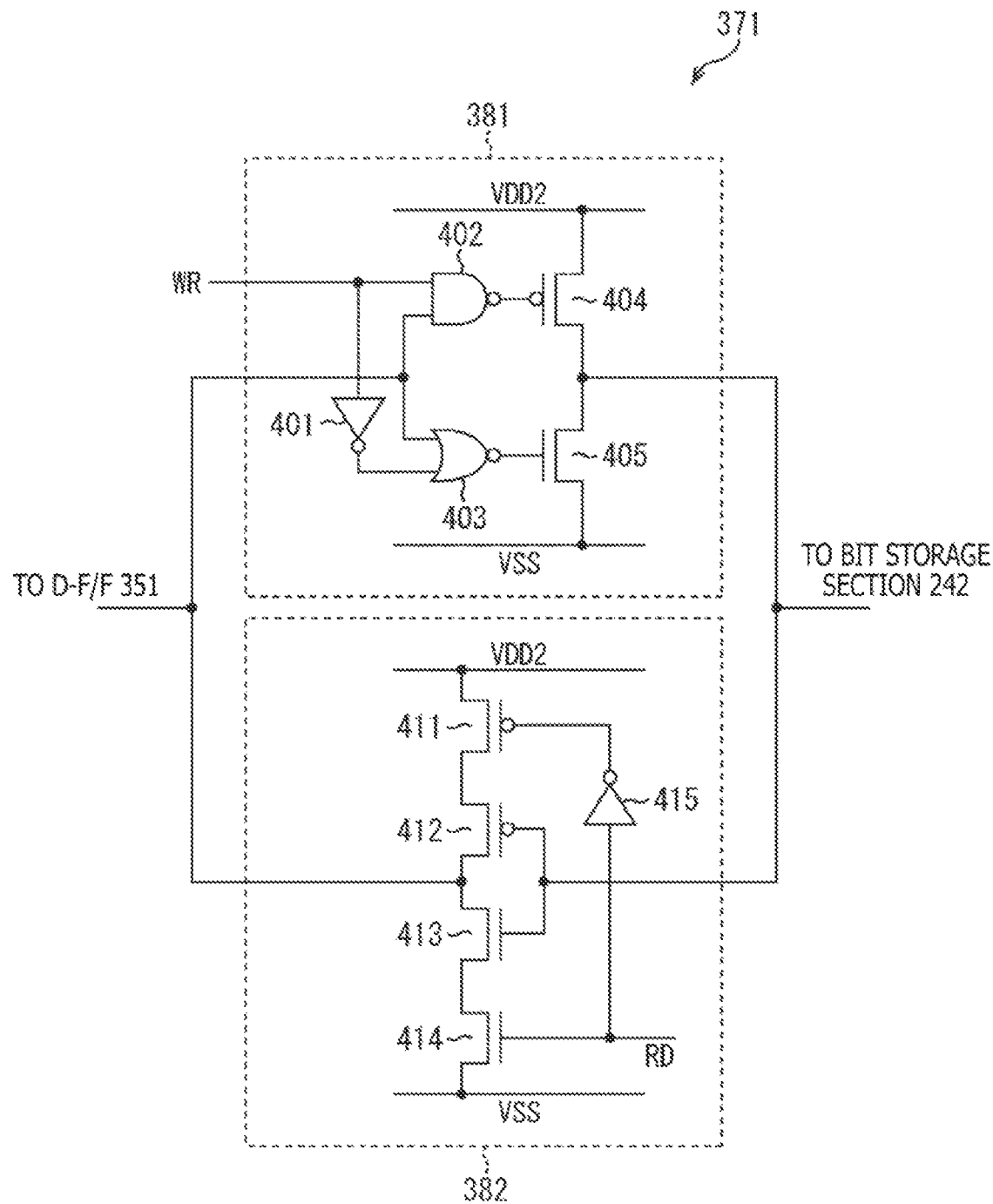
FIG. 12 is a diagram depicting an example of a configuration of a bidirectional buffer circuit.

FIG. 12 depicts an example of a configuration of the bidirectional buffer circuit 371.

The bidirectional buffer circuit 371 depicted in FIG. 12 includes the buffer circuit 381 and the inverter circuit 382.

The buffer circuit 381 includes an inverter 401, a NAND circuit 402, a NOR circuit 403, a PMOS transistor 404, and an NMOS transistor 405.

In the buffer circuit 381, when the writing control signal WR is Hi, the output of the NAND circuit 402 and the output of the NOR circuit 403 are both inversions of the time code supplied from the D-F/F 351 of the time code transferring section 23. Since the output of the buffer circuit 381 is further inverted, the output of the buffer circuit 381 becomes eventually the same value as the time code supplied from the D-F/F 351. When the writing control signal WR is Lo, the output of the NAND circuit 402 is Hi, while the output of the NOR circuit 403 is Lo. Thus, the output of the buffer circuit 381 is in the Hi-Z state.

By contrast, the inverter circuit 382 includes a clocked inverter including two PMOS transistors 411 and 412, two NMOS transistors 413 and 414, and an inverter 415.

In the inverter circuit 382, when the reading control signal RD is Hi, the clocked inverter becomes active and the inverter circuit 382 inverts and outputs the time code supplied from the bit storage section 242. When the reading control signal RD is Lo, the clocked inverter becomes inert (inactive) and the output of the inverter circuit 382 is in the Hi-Z state.

<Multi-Substrate Configuration 1>

Although the solid-state imaging apparatus 1 has been described to be formed on one semiconductor substrate 11 in the above description, the circuits may be separately formed on a plurality of semiconductor substrates 11 to configure the solid-state imaging apparatus 1.

Figure 13:
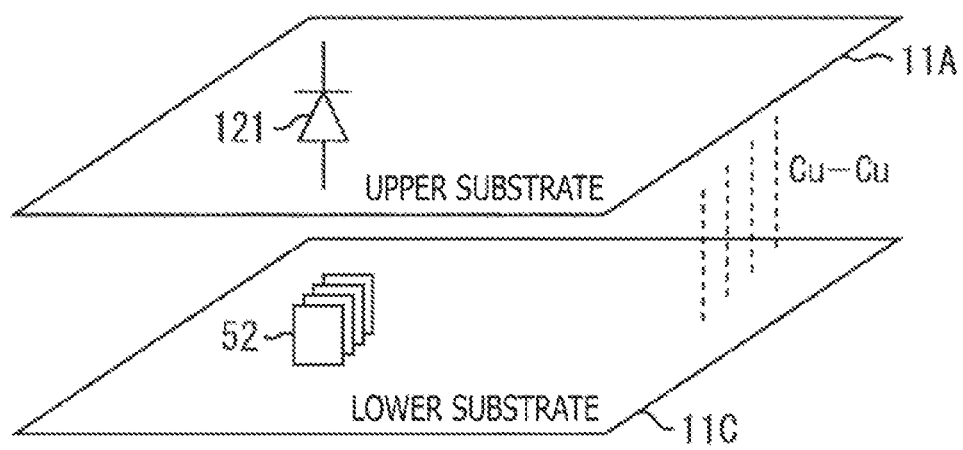
FIG. 13 is a conceptual diagram of the solid-state imaging apparatus including two stacked semiconductor substrates.

FIG. 13 depicts a conceptual diagram of the solid-state imaging apparatus 1 including two stacked semiconductor substrates 11 of an upper substrate 11A and a lower substrate 11C.

At least the pixel circuit 41 including the photodiode 121 is formed on the upper substrate 11A. At least the data storage section 52, which stores the time code, and the time code transferring section 23 are formed on the lower substrate 11C. The upper substrate 11A and the lower substrate 11C are bonded by metal bonding such as Cu—Cu, for example.

Figure 14:
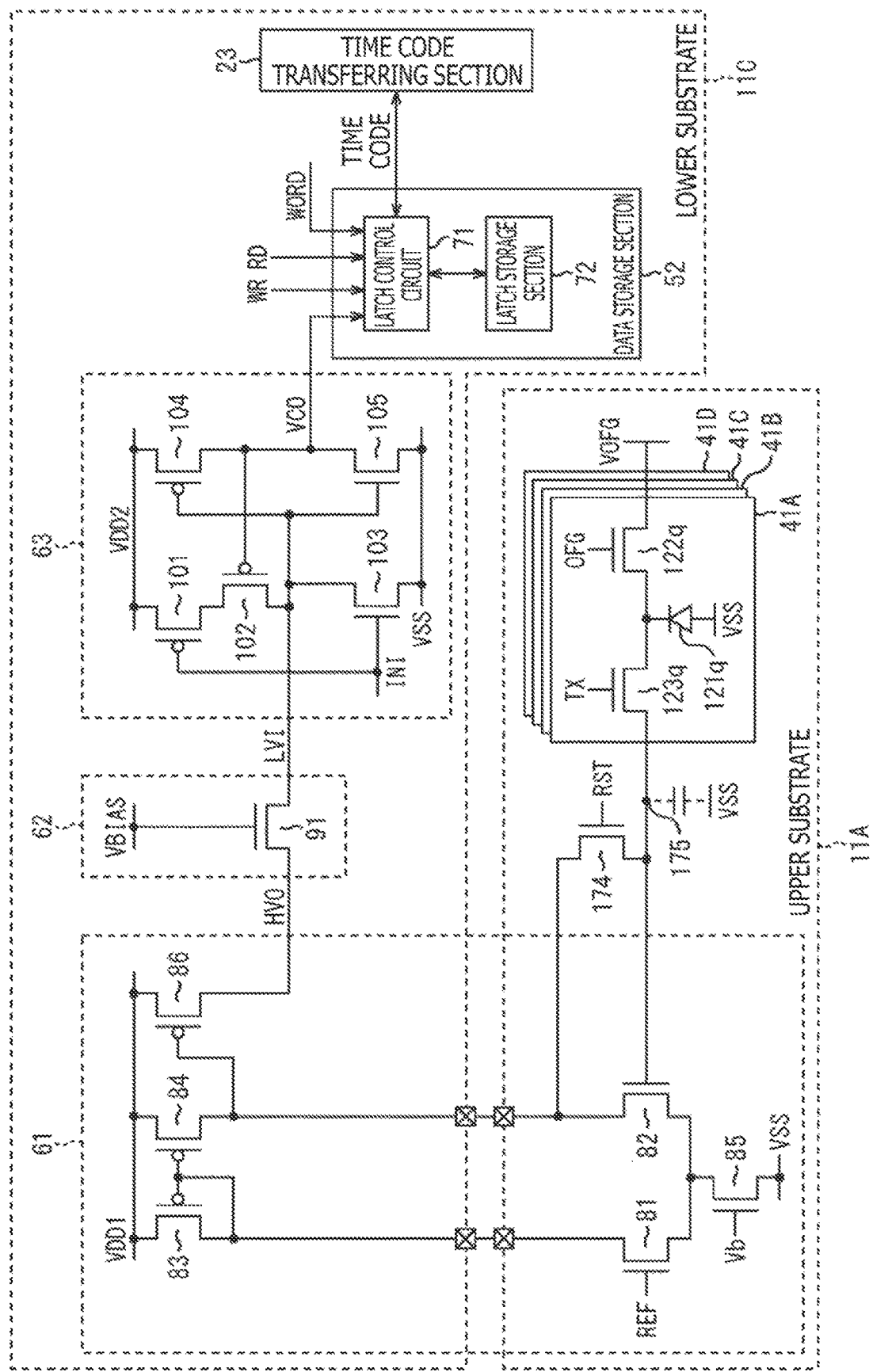
FIG. 14 is a diagram depicting an example of a circuit configuration for the case of the solid-state imaging apparatus including the two semiconductor substrates.

FIG. 14 depicts an example of a circuit configuration formed on each of the upper substrate 11A and the lower substrate 11C.

The pixel circuit 41 and the circuits of the transistors 81, 82, and 85 of the differential input circuit 61 of the ADC 42 are formed on the upper substrate 11A. The circuits of the ADC 42, which exclude the transistors 81, 82, and 85, and the time code transferring section 23 are formed on the lower substrate 11C.

<Multi-Substrate Configuration 2>

Although FIGS. 13 and 14 are examples in which the solid-state imaging apparatus 1 includes the two semiconductor substrates 11, the solid-state imaging apparatus 1 may include three semiconductor substrates 11.

Figure 15:
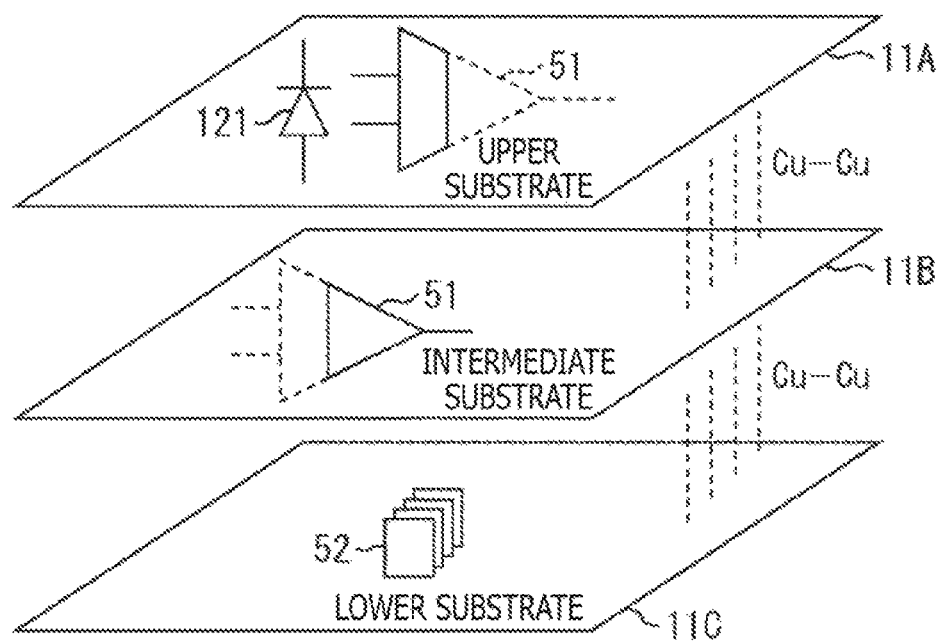
FIG. 15 is a conceptual diagram of the solid-state imaging apparatus including three stacked semiconductor substrates.

FIG. 15 depicts a conceptual diagram of the solid-state imaging apparatus 1 including the three stacked semiconductor substrates 11 of the upper substrate 11A, an intermediate substrate 11B, and the lower substrate 11C.

The pixel circuit 41 including the photodiode 121 and at least a part of the circuits of the comparator circuit 51 are formed on the upper substrate 11A. At least the data storage section 52, which stores the time code, and the time code transferring section 23 are formed on the lower substrate 11C. The remaining circuits of the comparator circuit 51 that are not arranged on the upper substrate 11A are formed on the intermediate substrate 11B. The upper substrate 11A and the intermediate substrate 11B, and the intermediate substrate 11B and the lower substrate 11C are bonded by metal bonding such as Cu—Cu, for example.

Figure 16:
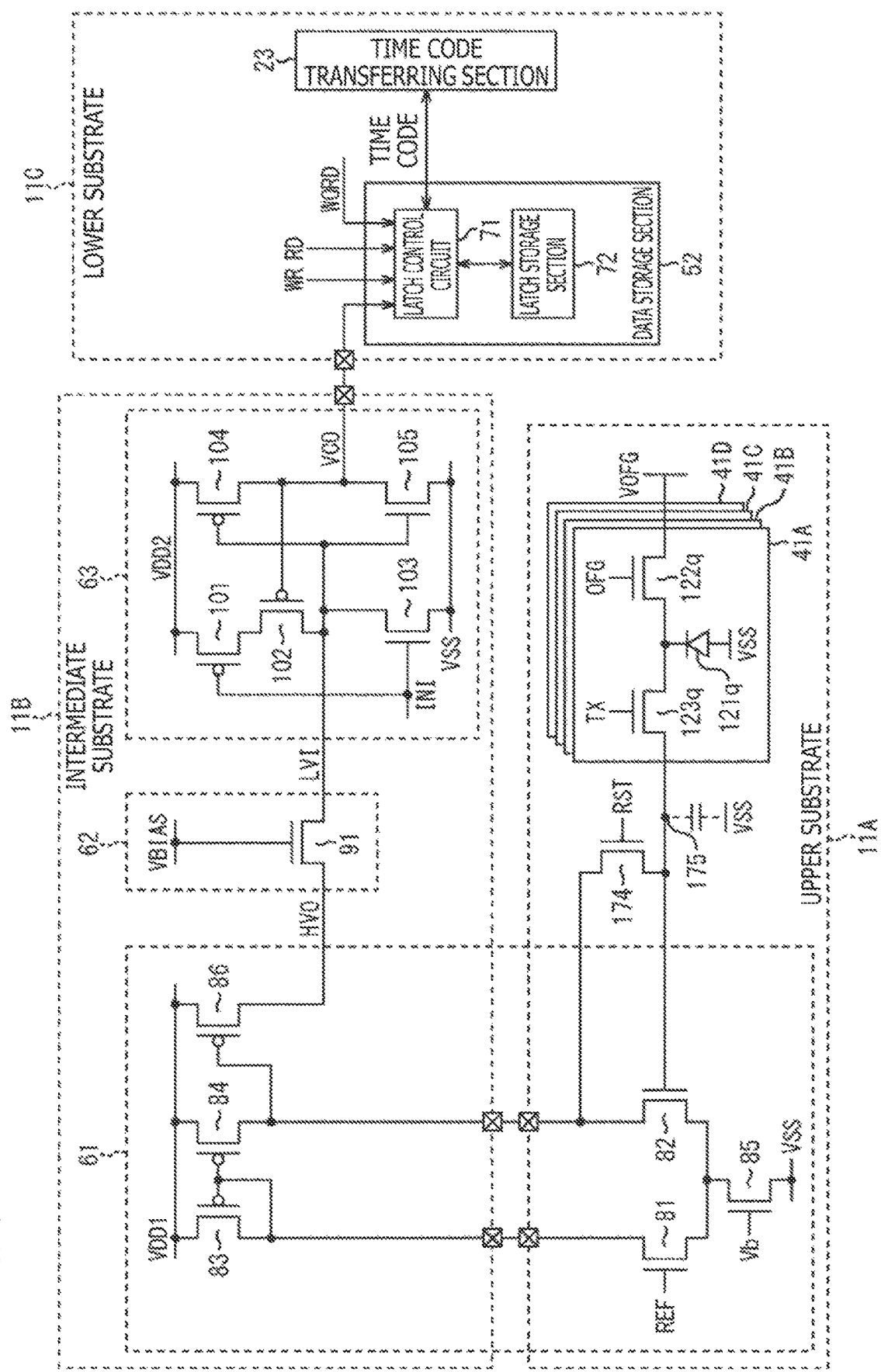
FIG. 16 is a diagram depicting an example of a circuit configuration for the case of the solid-state imaging apparatus including the three semiconductor substrates.

FIG. 16 depicts an example of circuit arrangement of each semiconductor substrate 11 in a case where the solid-state imaging apparatus 1 includes the three semiconductor substrates 11.

In the example in FIG. 16, the circuits arranged on the upper substrate 11A are the same as the circuits on the upper substrate 11A depicted in FIG. 14. The remaining circuits of the comparator circuit 51 are arranged on the intermediate substrate 11B. The data storage section 52 and the time code transferring section 23 are arranged on the lower substrate 11C. It is noted that these multi-substrate configurations can also be similarly implemented in the second embodiment described next.

Next, a configuration of the present technology will be described as the second embodiment, focusing on the difference from the above-described pixel ADC image sensor.

2. Second Embodiment

<Example of Configuration of Pixels>

Figure 17:
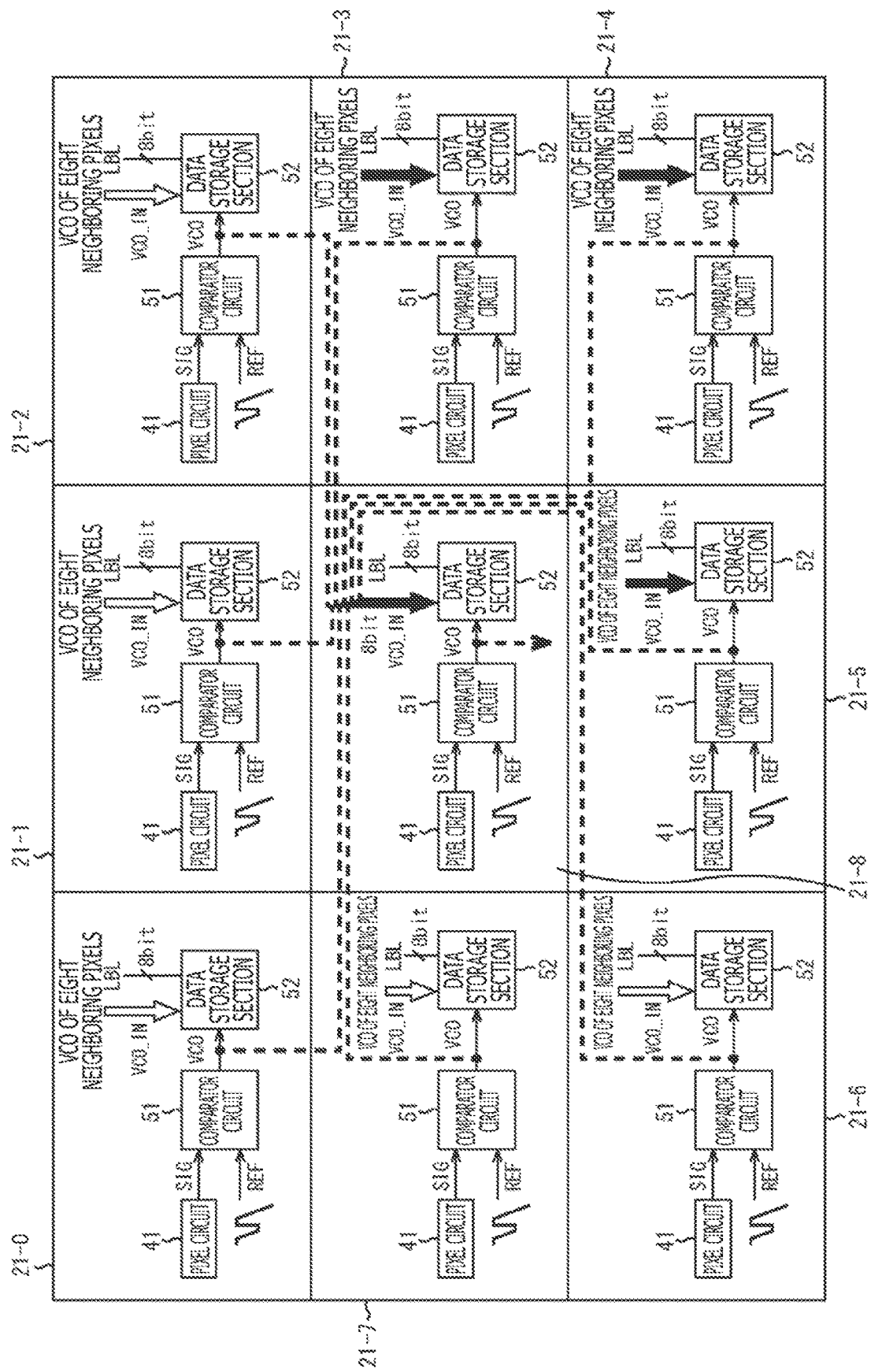
FIG. 17 is a block diagram depicting an example of configurations of pixels to which the present technology is applied.

FIG. 17 is a block diagram depicting an example of configurations of pixels to which the present technology is applied. A pixel of interest 21-8 and pixels 21-0 to 21-7 adjacent thereto are depicted in the example in FIG. 17. It is noted that although the pixels 21-0 to 21-7 (eight pixels) adjacent to the pixel of interest 21-8 are depicted as the neighboring pixels in the example in FIG. 17, the scope of the present technology is not limited thereto.

As depicted in FIG. 17, each pixel 21 includes the pixel circuit 41, the comparator circuit 51, and the data storage section 52. Here, although the pixel circuit 41 and the comparator circuit 51 are basically configured similarly to the pixel circuit 41 and the comparator circuit 51 described above with reference to FIG. 4, the data storage section 52 is different from the data storage section 52 in FIG. 4. The details thereof will be described later.

In addition, the major difference from the first embodiment is that each VCO signal line, which is the output of the comparator circuit 51 of each of the neighboring pixels 21-0 to 21-7, is connected to the data storage section 52 of the pixel of interest 21-8 as VCO_IN. The VCO of the neighboring pixel 21-0, which serves as the least significant bit, is connected to the data storage section 52 of the pixel of interest 21 as an 8-bit bus signal (VCO_IN), while the VCO of the pixel 21-7, which serves as the most significant bit, is connected to the data storage section 52 of the pixel of interest 21 as an 8-bit bus signal (VCO_IN). In addition, although description is omitted in FIG. 17, similar connections are established among all the pixels 21.

For example, in a case where the pixel 21-7 is newly regarded as a pixel of interest, the pixel 21-0, the pixel 21-1, the pixel of (original) interest 21-8, the pixel 21-5, and the pixel 21-6, which are described in FIG. 17, a pixel (not depicted) adjacent to the pixel 21-7 in the southwest direction, a pixel (not depicted) adjacent to the pixel 21-7 in the west direction, a pixel (not depicted) adjacent to the pixel 21-7 in the northwest direction can be regarded as the neighboring pixels. The VCO of each of the neighboring pixels is connected to the data storage section 52 as the 8-bit VCO_IN bus of the pixel 21-7.

<Circuit Block of One-Pixel Unit of Pixels>

Figure 18:
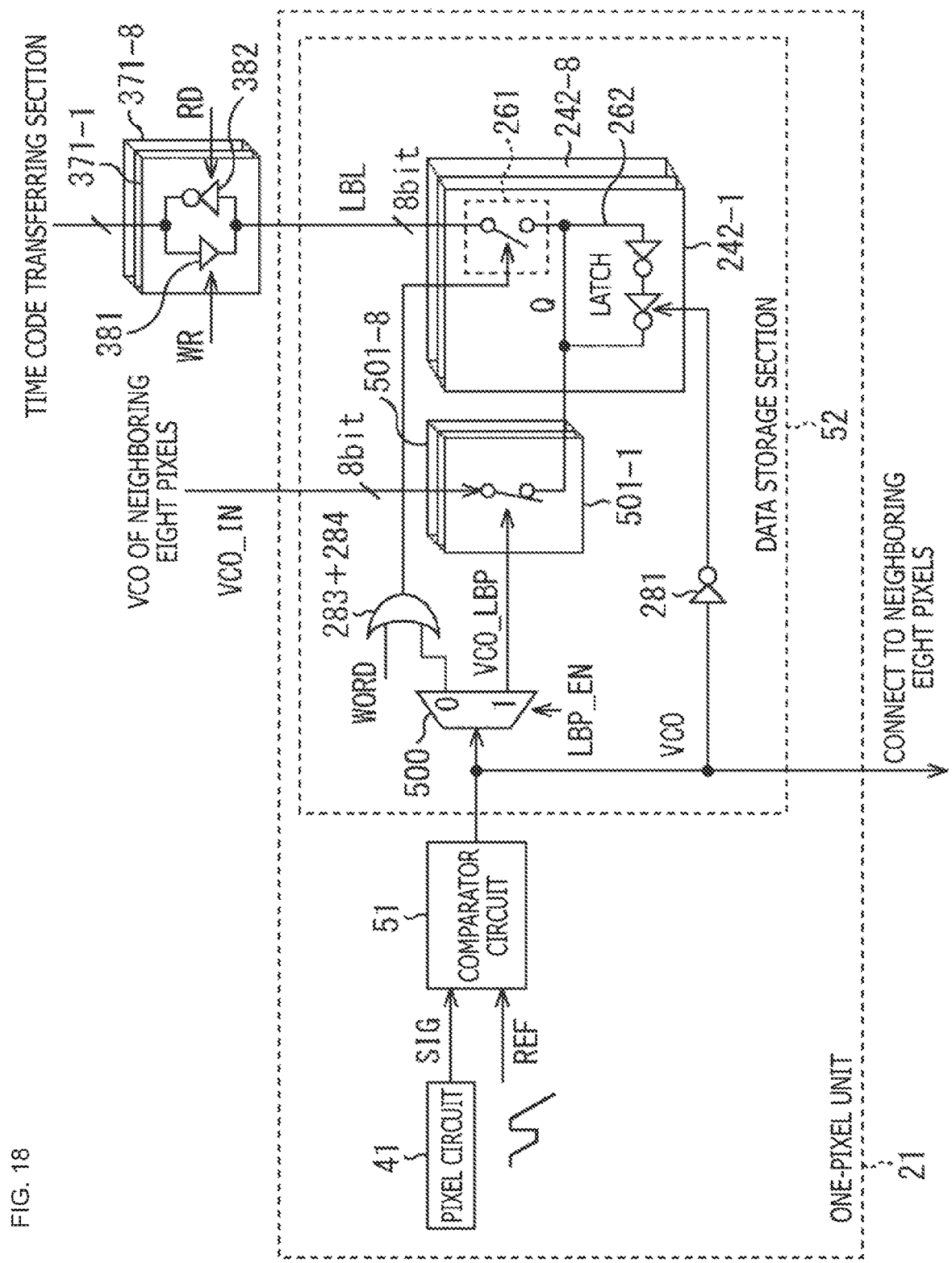
FIG. 18 is a circuit block diagram of a one-pixel unit of the pixels.

FIG. 18 is a circuit block diagram of a one-pixel unit of the pixels. The difference from FIG. 10 is that a binary demultiplexer circuit 500 and switch circuits 501-1 to 501-8 are added and the VCO signal line is connected to the neighboring pixels 21-0 to 21-7. The switch circuits 501-1 to 501-8 control a connection between the VCO 8-bit buses (VCO_IN) of the neighboring pixels and the latch of the pixel of interest. In other words, in the case of the example in FIG. 18, the latch control circuit 241 includes one inverter 281, an OR circuit (a NOR circuit+an inverter) 283+284, the demultiplexer circuit 500, and the switch circuits 501-1 to 501-8. The other configurations are the same as the configurations in FIG. 10. It is noted that although the portions expressed at the transistor level in FIG. 15 are more abstractly expressed in the example in FIG. 18, both are logically the same. In addition, in the example in FIG. 18, bus wiring connecting the bit storage section 242 (bit storage sections 242-1 to 242-8) (hereinafter also collectively referred to as a latch circuit 242) and the bidirectional buffer circuit 371 (bidirectional buffer circuits 371-1 to 371-8) is added as an LBL (local bit line). It is noted that in the example in FIG. 18, the latch circuit 242 includes two inverters.

Here, each of the switch circuits 501-1 to 501-8 is a circuit that causes the signal lines at both ends of the circuit to be electrically continuous when 1 (H logic) has been input into the control terminal thereof, while becoming high impedance when 0 (L logic) has been input into the control terminal. In addition, the demultiplexer circuit 500 is a circuit that outputs the logic of the input terminal to an output terminal 1 (an output terminal 0 outputs the L logic at this time) when 1 (H logic) has been input into the control terminal, while outputting the logic of the input terminal to the output terminal 0 (the output terminal 1 outputs the L logic at this time) when 0 (L logic) has been input into the control terminal.

Controlling a control signal LBP_EN of the demultiplexer circuit 500 can switch between an imaging mode and an LBP feature extraction mode. Specifically, the logic of the VCO signal is transmitted to one of the inputs of the NOR at the time of LBP_EN=0 (imaging mode). The inputs of the control terminals of the switch circuits 501-1 to 501-8 become 0 (L logic), and the VCO_IN and the latch circuit are separated, resulting in the circuit state that is logically equivalent to the circuit state in FIG. 10. This allows, therefore, implementation of an imaging function equivalent to the imaging function in the first embodiment described above.

In addition, the logic of the VCO signal is transmitted to the inputs of the control terminals of the switch circuits 501-1 to 501-8 and the VCO of the pixel of interest controls the connection/disconnection between the VCO_IN and the latch circuit 242 at the time of LBP_EN=1 (LBP feature extraction mode). By contrast, among the outputs of the demultiplexer circuit 500, the output connected to the NOR becomes 0 (L logic). This results in WORD logic=NOR output logic and only the WORD signal controls the connection/disconnection between the latch circuit 242 and the LBL wiring.

<Operations of Imaging Mode and LBP Feature Extraction Mode>

Next, the operation at the time of the imaging mode and the operation at the time of the LBP feature extraction mode will be described with reference to FIGS. 19 to 21.

Figure 19:
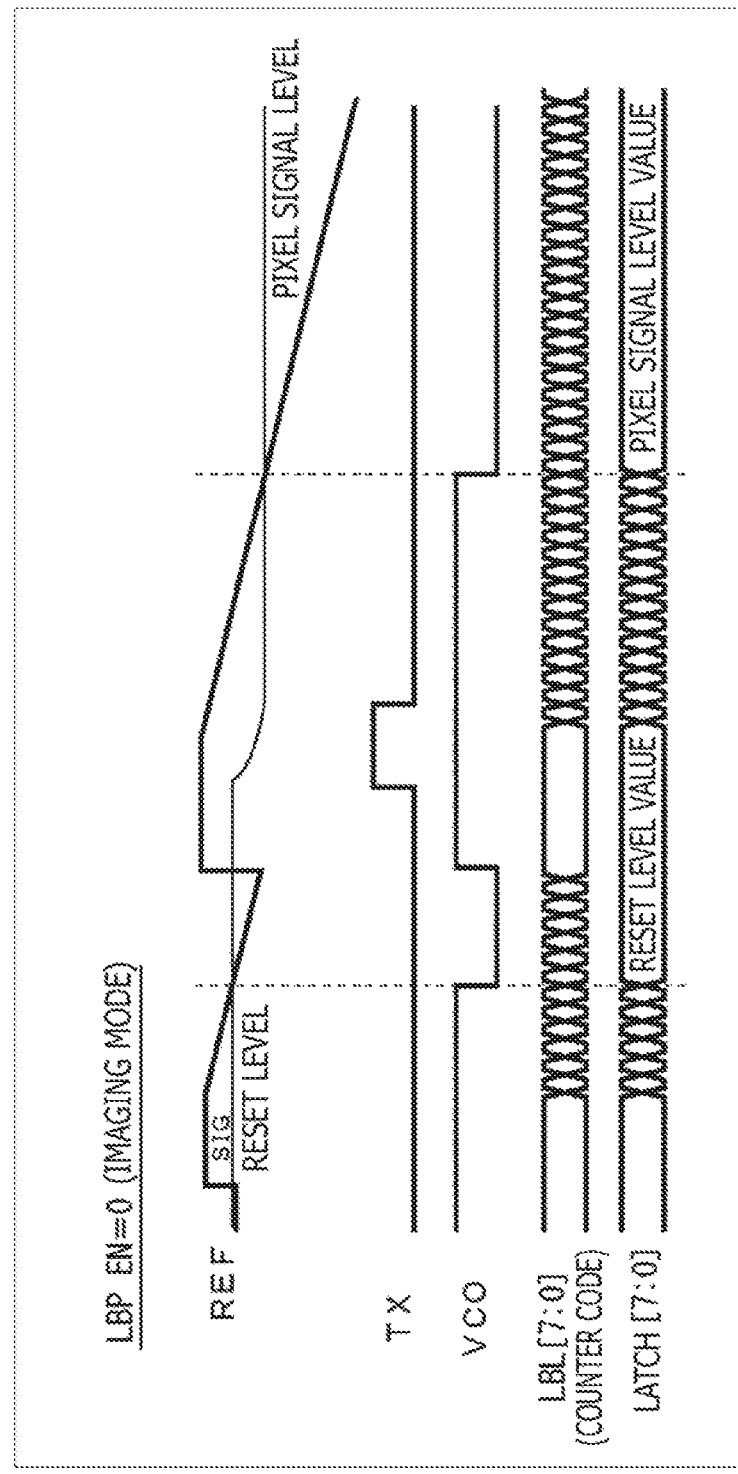
FIG. 19 is a diagram depicting operation timing at the time of an imaging mode.

FIG. 19 is a diagram depicting a simplified timing chart of the REF, SIG, TX, VCO, LBL, and latch at the time of LBP_EN=(imaging mode). The AD conversion of the reset level and the AD conversion of the pixel signal level are sequentially performed. The time code is transmitted to the latch circuit 242 via the LBL in line with the slope operation of the REF. At the timing when the REF and the SIG cross, the VCO is inverted from H to L by the operation of the comparator circuit 51. Accordingly, the time code written to the latch circuit 242 at this timing is latched and held in the latch circuit 242, and the AD conversion is performed. The latched time code (AD-converted data) is output to the outside of the pixel array via the time code transferring section 23 (not depicted). In addition, subtracting the reset level from the pixel signal level (CDS processing) can cancel the variations of the comparator circuit 51 and the charge injection, feedthrough, and the like at the time of the reset operation. It is noted that since the operation of the imaging mode is similar to the operation in the first embodiment described above with reference to FIG. 8, the description thereof is omitted.

Figure 20:
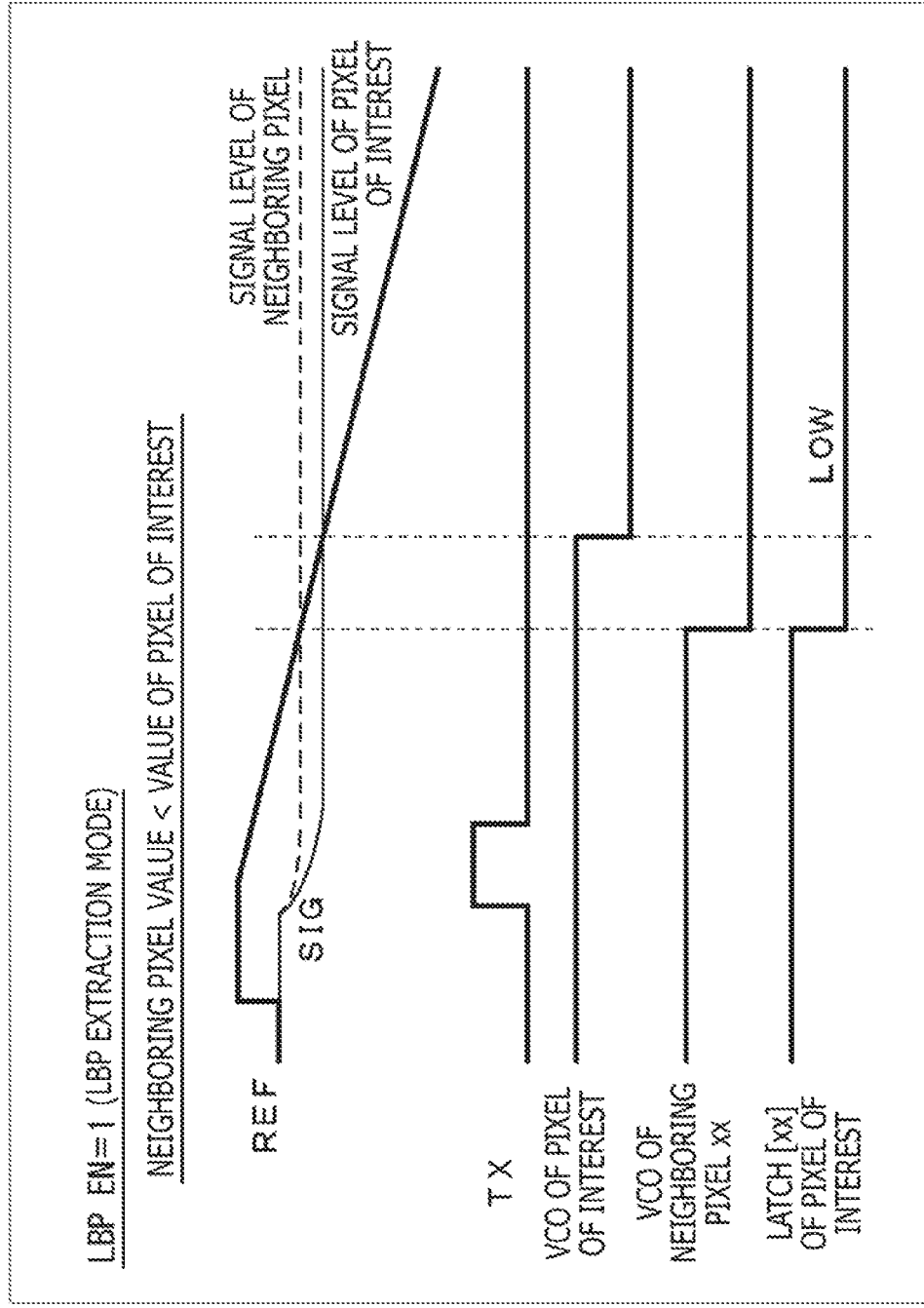
FIG. 20 is a diagram depicting operation timing at the time of an LBP feature extraction mode.

FIG. 20 depicts a simplified timing chart in a case where LBP_EN=1 (LBP feature extraction mode) and the pixel value of a pixel of interest is greater than the pixel value of a certain neighboring pixel xx. When TX has been driven and the pixel signal level has been read, the amplitude of the SIG of the pixel of interest is greater since the signal level of the pixel of interest is higher than the signal level of the neighboring pixel xx. Accordingly, the inversion timing of the VCO of the neighboring pixel xx precedes the inversion timing of the VCO of the pixel of interest and the VCO of the neighboring pixel xx is inverted from H to L. Here, focusing on the latch (the xxth bit) of the pixel of interest, as described above, since the switch circuit 501 is electrically continuous and the VCO of the neighboring pixel xx is connected (the switch circuit 261 is in high impedance) due to LBP_EN=1, the transition is similar to the transition of the VCO of the neighboring pixel xx. After that, at the timing when the VCO of the pixel of interest is inverted from H to L, the latch circuit 242 of the pixel of interest latches and holds the L logic written at this point in time.

Figure 21:
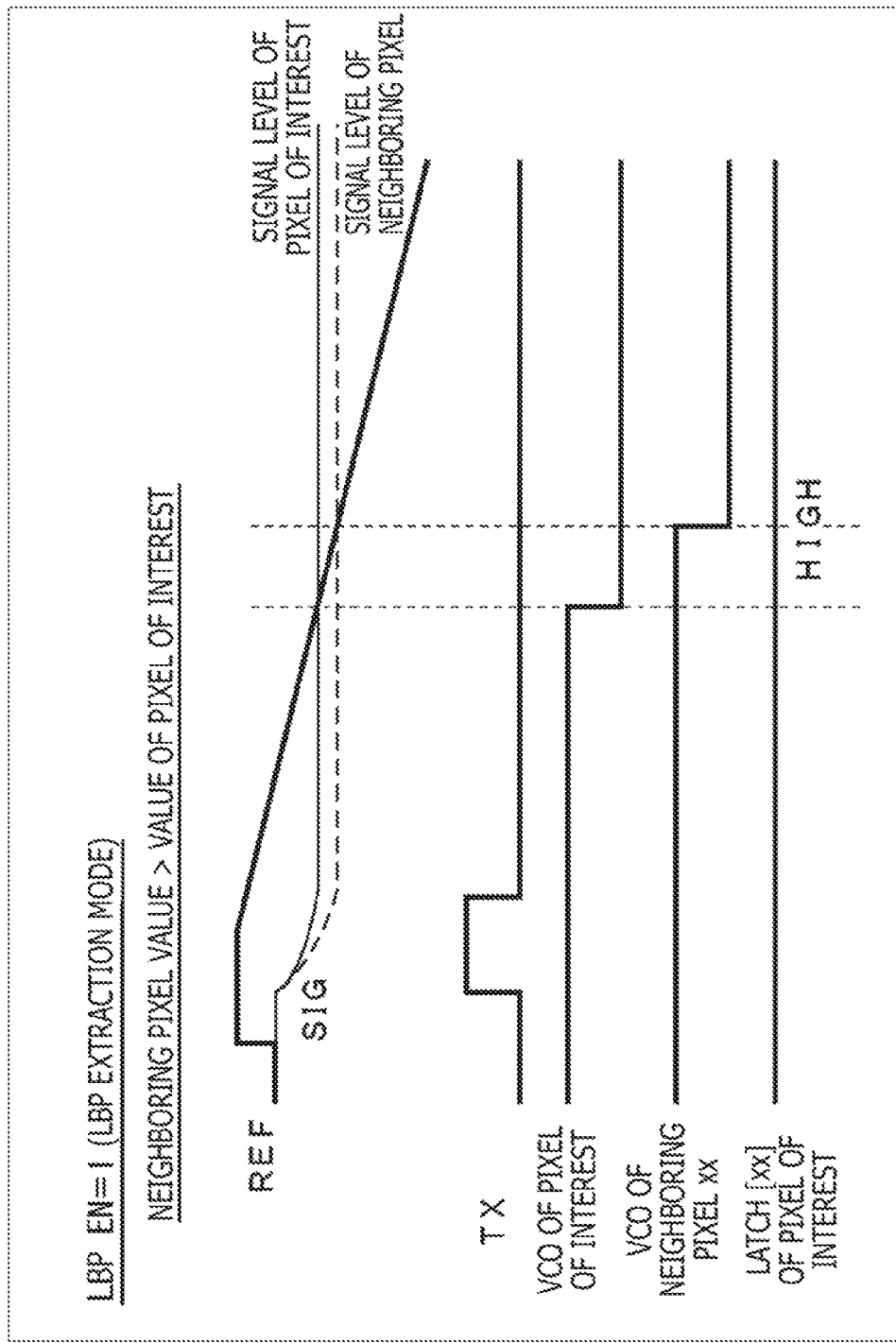
FIG. 21 is a diagram depicting operation timing at the time of the LBP feature extraction mode.

Next, a case where LBP_EN=1 (LBP feature extraction mode) and the pixel value of a pixel of interest is smaller than the pixel value of a certain neighboring pixel xx will be similarly considered with reference to FIG. 21. Since the pixel value of the neighboring pixel xx>the value of the pixel of interest, the VCO of the pixel of interest is inverted from H to L prior to the VCO of the neighboring pixel xx. At this point in time, since the H state of the VCO of the neighboring pixel xx has been written to the latch circuit 242 (the xxth bit) of the pixel of interest, the latch circuit 242 latches and holds this H logic.

By the above operation, data obtained by binarizing the pixel value of the neighboring pixel using the value of the pixel of interest as the threshold value is held in the corresponding bit of the 8-bit latch circuit of the pixel of interest. As can be seen from this definition, this 8-bit data is exactly the LBP value of the pixel of interest.

After the LBP value is held in the latch, reading can be performed in a manner exactly similar to a manner of transferring the AD-converted pixel value data from the latch to the outside of the pixel array in the imaging mode. In addition, it is also possible to configure and output LBP histogram data from the image sensor by counting the number of appearing pixels for each LBP value in a logic circuit outside the pixel array, as necessary.

It is noted that noise reduction processing (CDS processing) by the reset level subtraction performed in the imaging mode cannot be performed in principle in the LBP feature extraction mode. Therefore, effective means is to perform noise reduction processing that does not depend on the reset level subtraction. For example, applicable means is that when the output of the differential input circuit of the comparator circuit 51 is connected to the SIG and reset is performed, the control pulse of the reset transistor (switch) is caused to transition more slowly than usual and cut or band limitation is applied.

Figure 22:
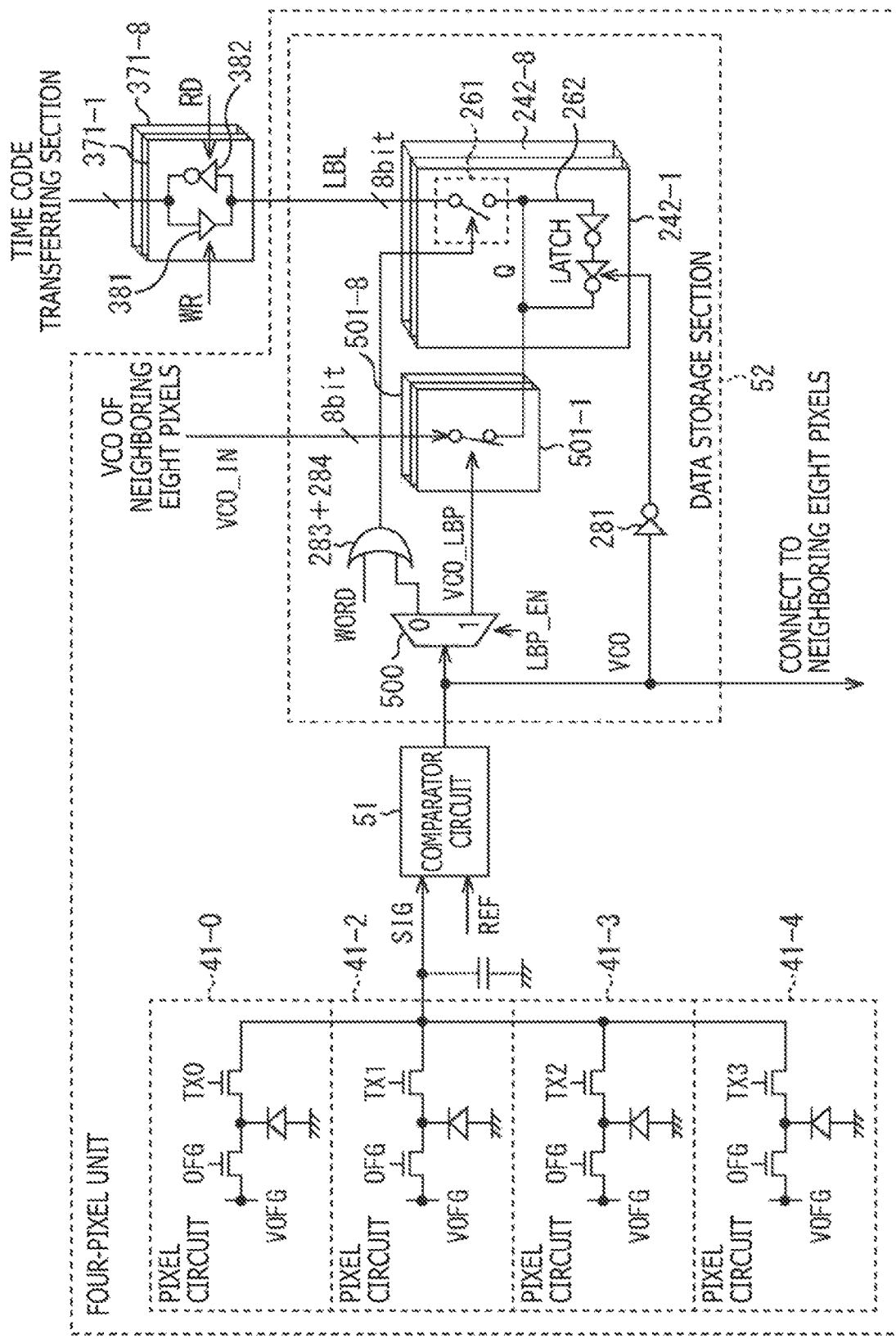
FIG. 22 is a circuit block diagram of a one-pixel unit of the pixels for the case of four-pixel sharing.

In addition, one comparator circuit 51 and one data storage section 52 may be shared by a plurality of pixels (a pixel group including a plurality of pixels will be referred to as an area block), as depicted in FIG. 22. In this case, a TX signal is divided for each shared pixel (divided into four types of TX0/TX1/TX2/TX3 in the figure) and "AD conversion+a transfer to the outside of the array" or "LBP feature extraction+a transfer to the outside of the array" of each pixel is performed in a time division manner.

<Another Circuit Block of One-Pixel Unit of Pixels>

Figure 23:
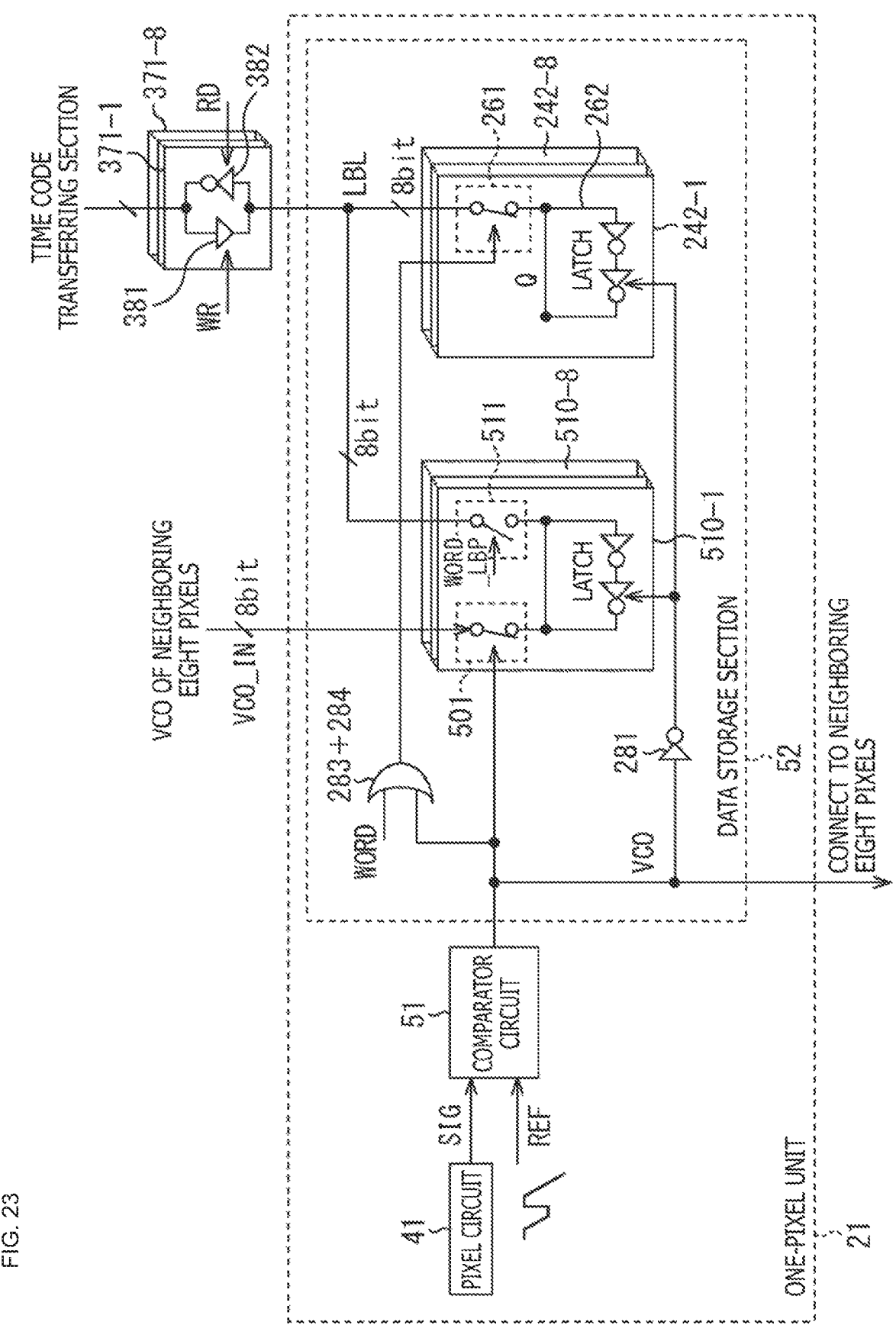
FIG. 23 is a circuit block diagram of a one-pixel unit of the pixels in a case where the LBP feature extraction mode and the imaging mode can be simultaneously executed.

FIG. 23 is another circuit block diagram of a one-pixel unit of the pixels. The circuit block in FIG. 23 only introduces LBP-dedicated latch circuits 510-1 to 510-8 and a control signal WORD_LBP and eliminates the demultiplexer. The switch circuit 501 connecting to the VCO of a neighboring pixel, a switch circuit 511 connecting the LBL, and the control signal WORD_LBP thereof are added to each of the LBP-dedicated latch circuits 510-1 to 510-8. The control signal WORD_LBP is a control signal of the switch circuit 511 connecting the LBP-dedicated latch circuit 510 and the LBL.

With this configuration, the imaging mode and the LBP feature extraction mode can be simultaneously performed by using the latch circuit 242 as a pixel-value-dedicated latch and the latch circuit 510 as an LBP-dedicated latch. When data is read from the latch, the pixel-value AD-converted data is read using the WORD signal and the LBP value is read using the WORD_LBP signal in a time division manner. The operation principle of the AD conversion/LBP feature extraction itself of the pixel value is similar to the operation principle thereof in the first embodiment.

Figure 24:
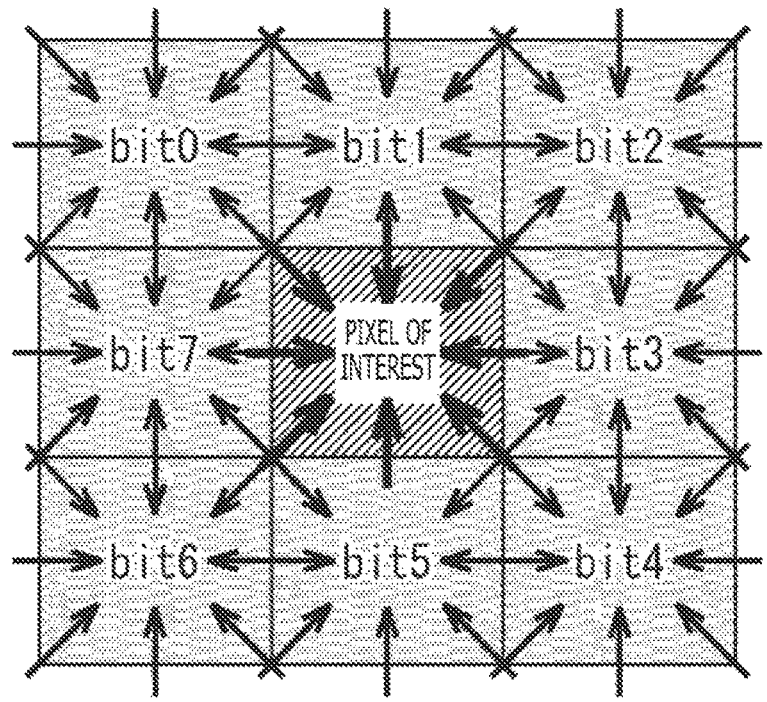
FIG. 24 is a diagram explaining VCO wiring connections between neighboring pixels.

Next, VCO wiring connections between the neighboring pixels according to the present technology will be described with reference to FIGS. 24 and 25. In FIG. 24, VCO wiring connection relationships between a pixel of interest and adjacent eight neighboring pixels are represented by arrows. In other words, FIG. 24 is a representation of an image simplified from FIG. 17, focusing only on the VCO wiring connection relationships.

In the example in FIG. 24, thick arrows represent VCO wiring of the neighboring pixels connected to the latch of the pixel of interest. Solid arrows represent VCO wiring connected to the latches of the neighboring pixels. In addition, the direction of each arrow represents the connection direction. As depicted in FIG. 24, there is a plurality of combinations of overlapping arrows pointing in mutually opposite directions. In other words, this indicates that relative relationships between the pixel value of the pixel of interest and the pixel values of the neighboring pixels are obtained redundantly. The LBP values mutually obtained in the pixels associated by a combination of overlapping arrows pointing in mutually opposite directions are equivalent as information (=magnitudes of the two pixels), and the relationship is such that one of the LBP values itself is a bit value inverted from the other.

Figure 25:
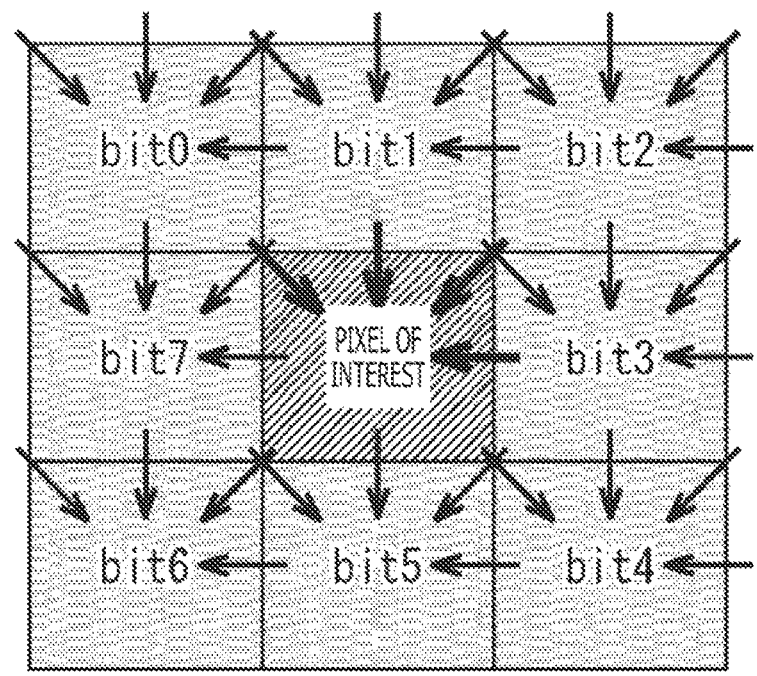
FIG. 25 is a diagram explaining VCO wiring connections between the neighboring pixels.

Therefore, it is possible to reduce the VCO wiring connections between the neighboring pixels to half, as depicted in FIG. 25. In this case, although the number of bits of the LBP value obtained in each pixel is halved (four bits in the example in the figure), a desired LBP value can be completely restored by calculation processing described below. It is noted that this calculation processing may be performed by an on-chip logic circuit outside the pixel array or may be performed outside an image sensor chip. In addition, the present embodiment is not limited to only the wiring connection relationships depicted in FIG. 25.

The zeroth bit of the LBP value obtained in the pixel of interest is set as the value of the zeroth bit of the pixel of interest without change.

The first bit of the LBP value obtained in the pixel of interest is set as the value of the first bit of the pixel of interest without change.

The second bit of the LBP value obtained in the pixel of interest is set as the value of the second bit of the pixel of interest without change.

The third bit of the LBP value obtained in the pixel of interest is set as the value of the third bit of the pixel of interest without change.

The zeroth bit of the LBP value obtained in the pixel adjacent to the pixel of interest in the southeast direction is bit-inverted and set as the value of the fourth bit of the pixel of interest.

The first bit of the LBP value obtained in the pixel adjacent to the pixel of interest in the south direction is bit-inverted and set as the value of the fifth bit of the pixel of interest.

The second bit of the LBP value obtained in the pixel adjacent to the pixel of interest in the southwest direction is bit-inverted and set as the value of the sixth bit of the pixel of interest.

The third bit of the LBP value obtained in the pixel adjacent to the pixel of interest in the west direction is bit-inverted and set as the value of the seventh bit of the pixel of interest.

As described above, the devisal described above with reference to FIGS. 24 and 25 leads to a reduction in the wiring area in each pixel and contributes to a higher resolution of the number of pixels.

Figure 26C:
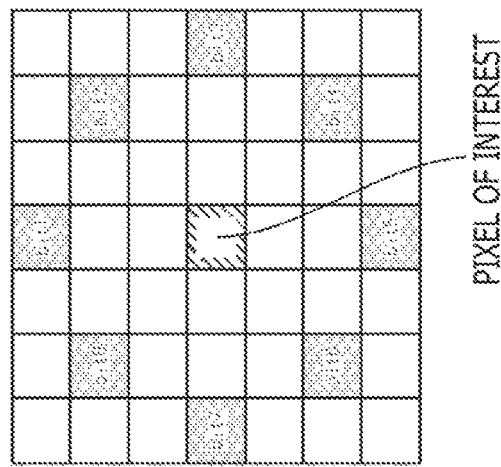
FIGS. 26A-26C are diagrams explaining the neighboring pixels.
Figure 26B:
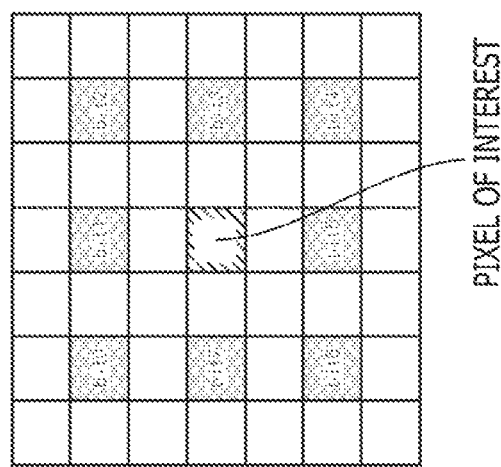
Figure 26A:
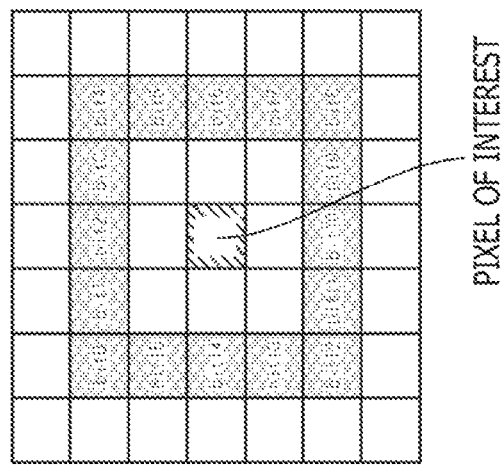

It is noted that the neighboring pixels are not limited to the case depicted in FIG. 24 where the eight pixels adjacent to the pixel of interest are used as the neighboring pixels. As depicted in FIG. 26A, surrounding sixteen pixels surrounding the adjacent eight pixels may be used as the neighboring pixels. In addition, as depicted in FIG. 26B, each of the four pixels at the corners among the surrounding sixteen pixels depicted in FIG. 26A and each of the four pixels located one pixel apart from the pixel of interest in the vertical and horizontal directions among the surrounding sixteen pixels may be used as the neighboring pixels. Further, as depicted in FIG. 26C, each of the four pixels at the corners among the surrounding sixteen pixels and each of the four pixels located two pixels apart from the pixel of interest in the vertical and horizontal directions may be used.

According to the present technology, as described above, omitting the AD conversion of the pixel signal values and reducing the amount of data to be output from the image sensor can reduce the power consumption of an image recognition system. In addition, the feature-amount extraction processing can be accelerated by parallel operations of all the pixels.

For example, considering an application to an 8-bit full HD image, it is possible to compress the amount of data to 0.032%.

3. Use of Image Sensor

Figure 27:
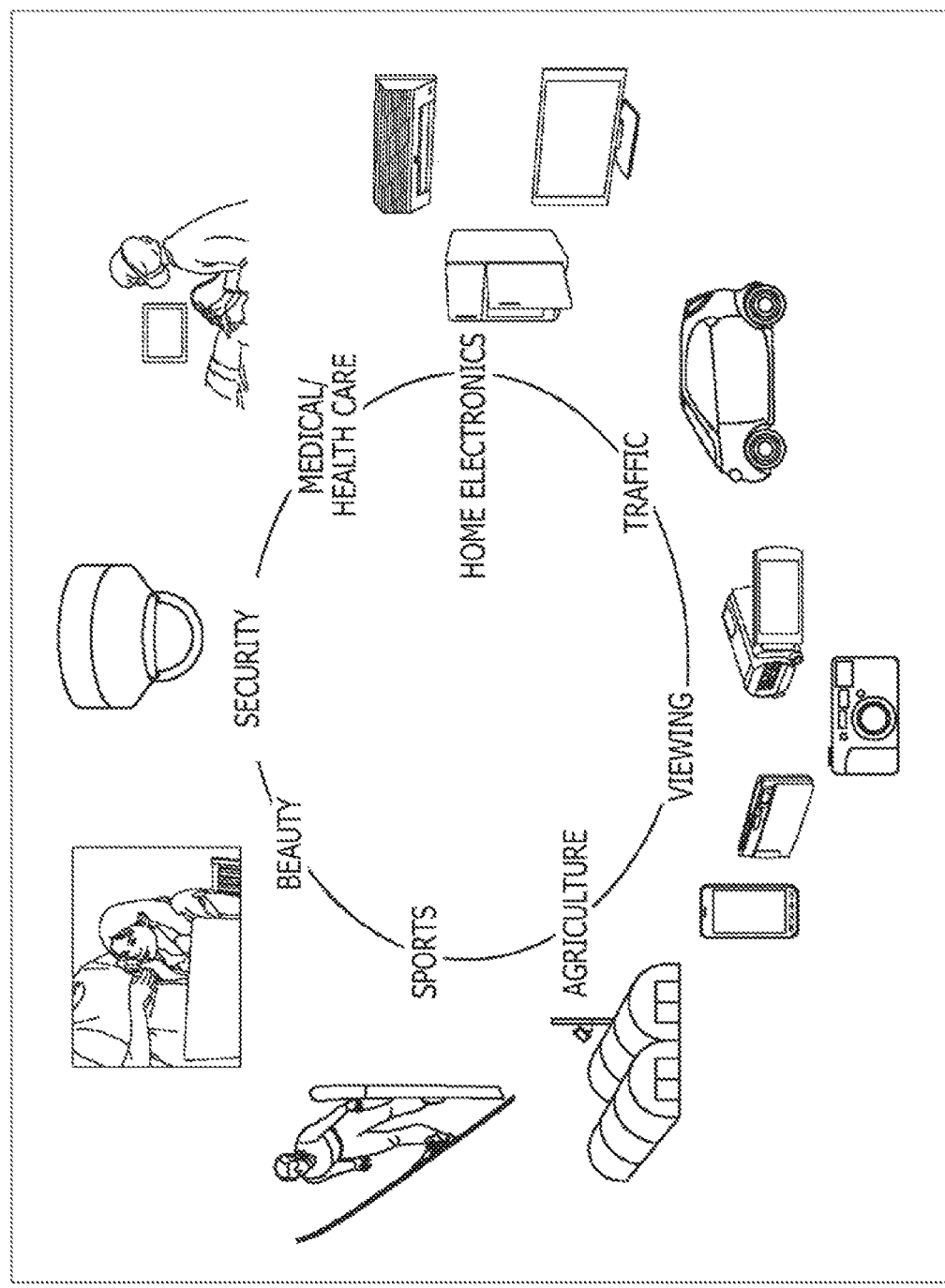
FIG. 27 is a diagram depicting a usage example of an image sensor to which the present technology is applied.

FIG. 27 is a diagram depicting a usage example using the above-described solid-state imaging apparatus.

The above-described solid-state imaging apparatus (image sensor) can be used in various cases for sensing light such as visible light, infrared light, ultraviolet light, or X-rays as described below, for example.

Apparatuses for photographing images in use for viewing such as digital cameras and mobile equipment having a camera function Apparatuses in use for traffic such as: on-vehicle sensors that photograph the front, the rear, the surroundings, the interior, and the like of a motor vehicle in order to, for example, achieve safe driving such as automatic stop and recognize the state of a driver; surveillance cameras that monitor traveling vehicles and roads; and distance measurement sensors that measure the distance between vehicles and the like Apparatuses in use for home electronics, such as TVs, refrigerators, and air conditioners, to photograph the user's gesture and operate the equipment according to the gesture Apparatuses in use for medical and health care such as endoscopes and apparatuses that carry out angiography using received infrared light Apparatuses in use for security such as security surveillance cameras and cameras for person identification Apparatuses in use for beauty such as skin measurement equipment that photographs the skin and microscopes that photographs the scalp Apparatuses in use for sports such as action cameras and wearable cameras for sports and the like Apparatuses in use for agriculture such as cameras for monitoring the conditions of fields and crops 4. Example of Electronic Equipment <Example of Configuration of Electronic Equipment>

Further, the present technology is not limited to the application to the solid-state imaging apparatus and can also be applied to an imaging apparatus. Here, the imaging apparatus refers to a camera system such as a digital still camera or a digital video camera, or electronic equipment having an imaging function such as a mobile phone. It is noted that there is also a case where the imaging apparatus refers to a module-type configuration mounted on electronic equipment, that is, a camera module.

Here, an example of a configuration of the electronic equipment according to the present technology will be described with reference to FIG. 28.

Figure 28:
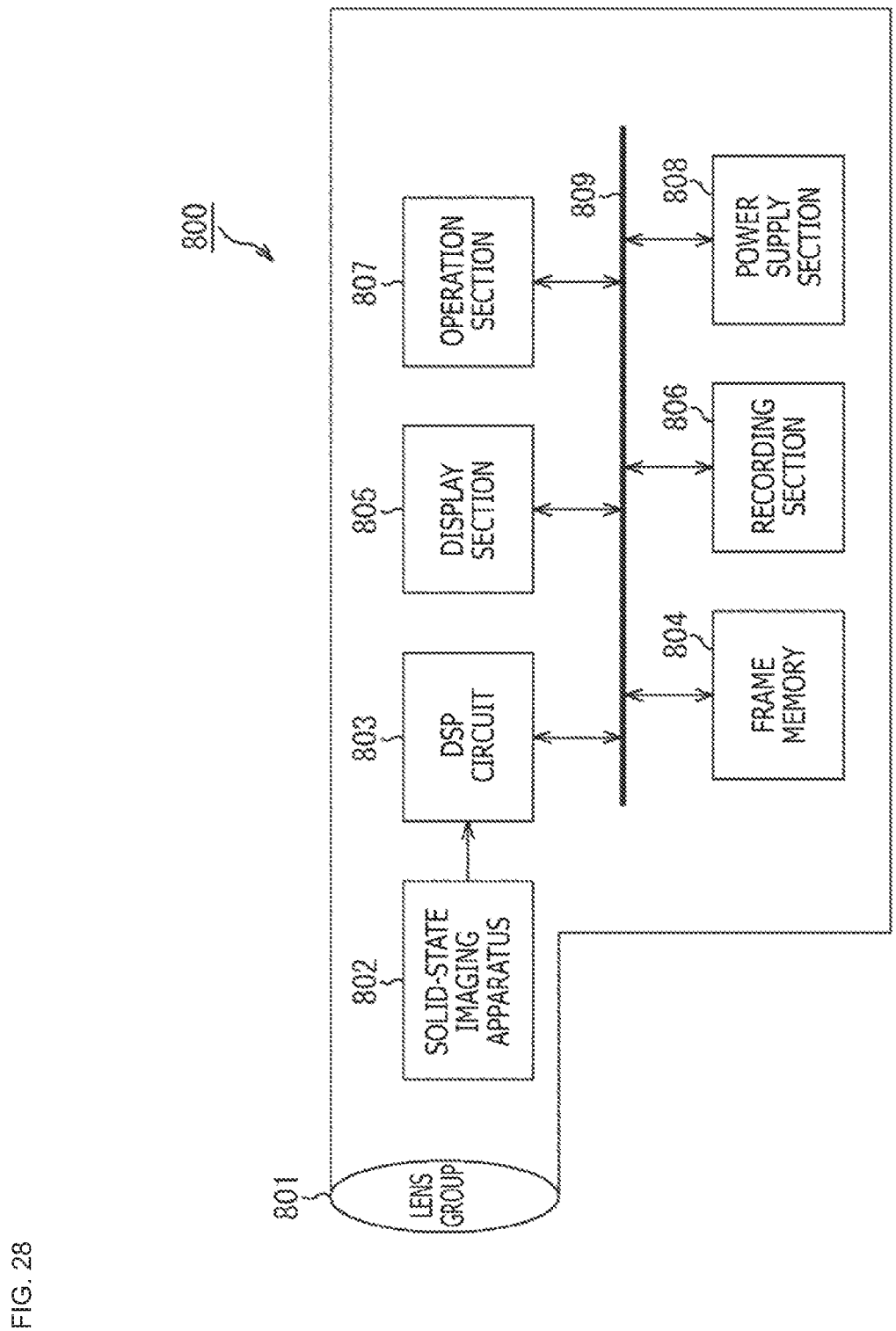
FIG. 28 is a block diagram depicting an example of a configuration of electronic equipment to which the present technology is applied.

An imaging apparatus 800 depicted in FIG. 28 is a block diagram depicting an example of the configuration of the imaging apparatus as the electronic equipment according to the present disclosure.

The imaging apparatus 800 in FIG. 28 includes an optical section 801, a solid-state imaging apparatus (imaging device) 802, and a DSP (digital signal processor) circuit 803. The optical section 801 includes a lens group and the like. The solid-state imaging apparatus 802 employs the configuration of the solid-state imaging apparatus 1 in FIG. 3. The DSP circuit 803 is a camera signal processing circuit. In addition, the imaging apparatus 800 also includes a frame memory 804, a display section 805, a recording section 806, an operation section 807, and a power supply section 808. The DSP circuit 803, the frame memory 804, the display section 805, the recording section 806, the operation section 807, and the power supply section 808 are mutually connected via a bus line 809.

The optical section 801 captures incident light (image light) from a subject and forms an image on an imaging surface of the solid-state imaging apparatus 802. The solid-state imaging apparatus 802 converts the light quantity of incident light from which the image has been formed on the imaging surface by the optical section 801 into electric signals on a pixel unit basis, and outputs the electric signals as pixel signals. As the solid-state imaging apparatus 802, the solid-state imaging apparatus 1 in FIG. 3, that is, the solid-state imaging apparatus including the comparator circuit 51 and the time code transferring section 23 can be used. The comparator circuit 51 reduces power consumption while improving the determination speed at the time of the AD conversion of pixel signals. The time code transferring section 23 can significantly reduce the circuit scale and power consumption.

The display section 805 includes a panel display apparatus such as a liquid-crystal panel or an organic EL (electro luminescence) panel, for example. The display section 805 displays a moving image or a still image imaged by the solid-state imaging apparatus 802. The recording section 806 records the moving image or the still image imaged by the solid-state imaging apparatus 802 on a recording medium such as a hard disk or a semiconductor memory.

The operation section 807 issues operation instructions on various functions included in the imaging apparatus 800 according to the operation by the user. The power supply section 808 appropriately supplies various types of power supplies, which serve as operation power supplies of the DSP circuit 803, the frame memory 804, the display section 805, the recording section 806, and the operation section 807, to these supply targets.

As described above, using the solid-state imaging apparatus 1 employing any of the above-described configurations as the solid-state imaging apparatus 802 can reduce power consumption while increasing the determination speed of the AD conversion. Therefore, high speed photographing and low power consumption can be realized in the imaging apparatus 800 such as a video camera, a digital still camera, or even a camera module for mobile equipment such as a mobile phone.

Although the comparator circuit 51 and the ADC 42 have been described as components incorporated in the solid-state imaging apparatus 1 in the above description, each of the comparator circuit 51 and the ADC 42 can be a product (a comparator/an AD converter) that is individually distributed.

5. Example of Application to Mobile Body

The technology according to the present disclosure (present technology) can be applied to various products. For example, the technology according to the present disclosure may be implemented as an apparatus to be mounted on any type of a mobile body such as a motor vehicle, an electric vehicle, a hybrid electric vehicle, a motorcycle, a bicycle, a personal mobility, an airplane, a drone, a ship, or a robot.

Figure 29:
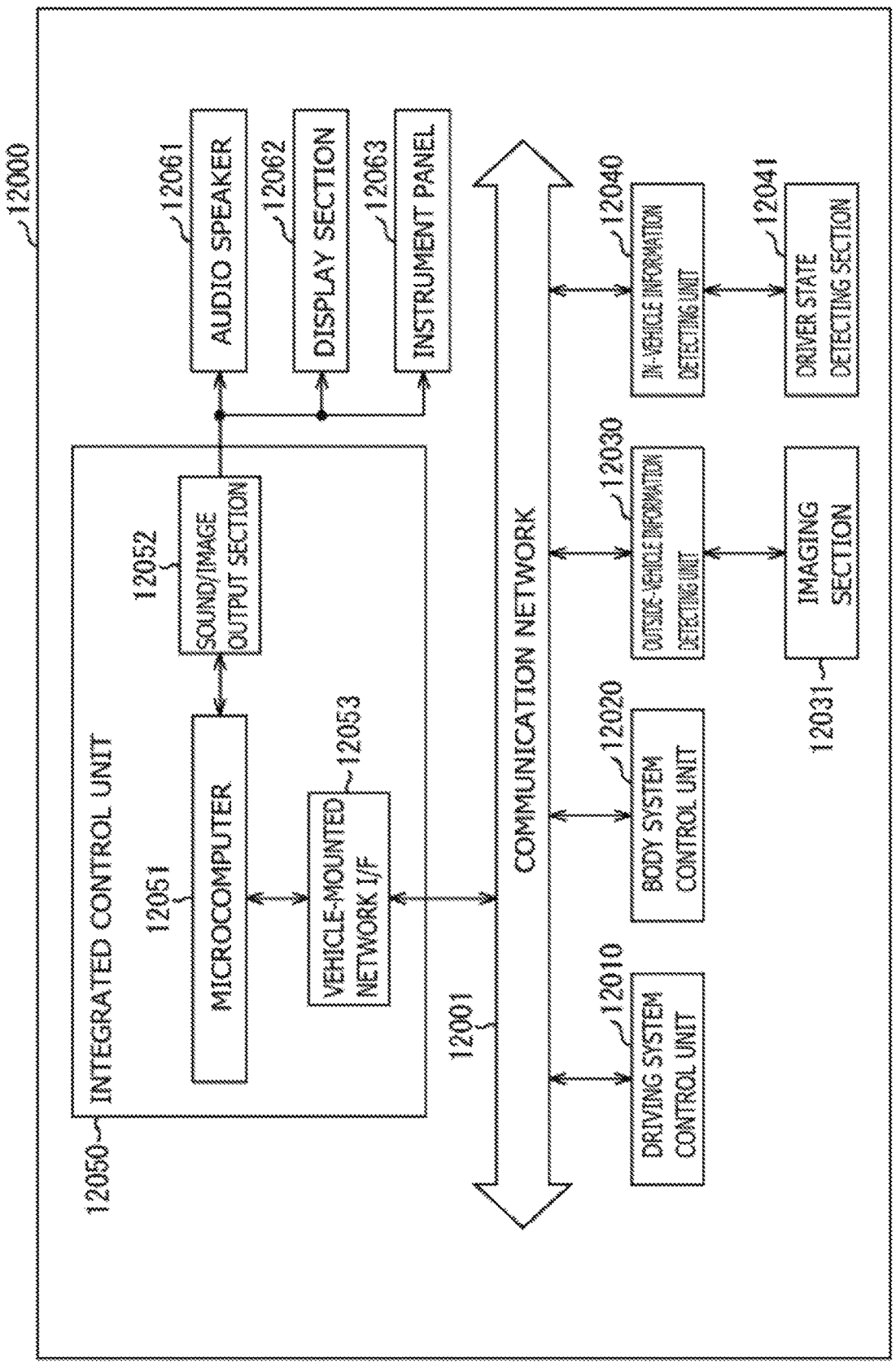
FIG. 29 is a block diagram depicting an example of schematic configuration of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
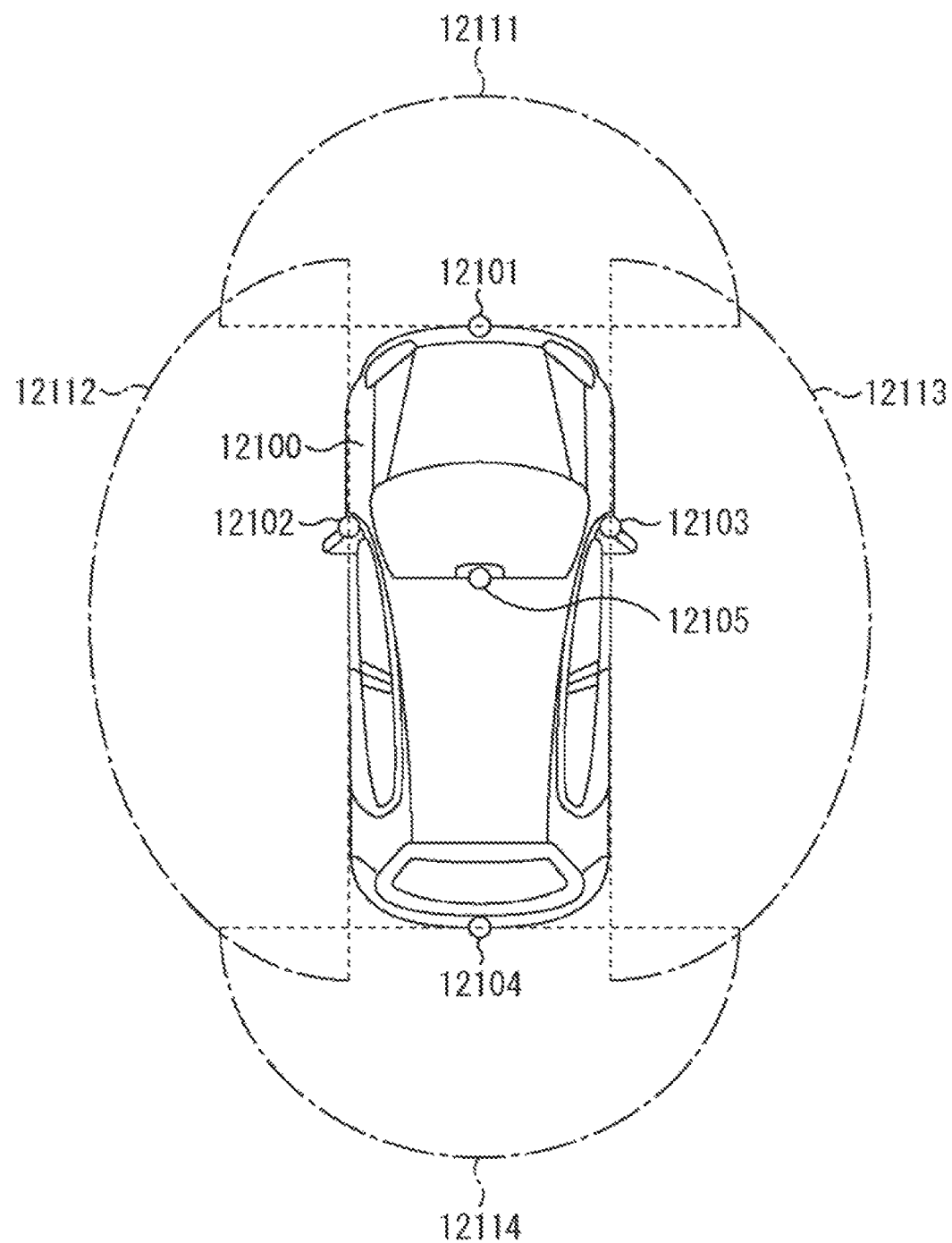
FIG. 30 is a diagram of assistance in explaining an example of installation positions of an outside-vehicle information detecting section and an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 (including the imaging sections 12101 to 12104) among the configurations described above. Specifically, the solid-state imaging apparatus 1 can be applied to the imaging section 12031 (including the imaging sections 12101 to 12104). Applying the technology according to the present disclosure to the imaging section 12031 (including the imaging sections 12101 to 12104) can reduce power consumption even in a vehicle.

It is noted that in the present specification, the steps describing the series of processes described above include not only processes executed chronologically according to the described order, but also processes executed in parallel or individually and not necessarily processed chronologically.

In addition, the embodiments in the present disclosure are not limited to the embodiments described above, and various modifications can be made without departing from the scope of the present disclosure.

In addition, the configuration described above as one apparatus (or processing section) may be divided and configured as a plurality of apparatuses (or processing sections). Conversely, the configurations described above as a plurality of apparatuses (or processing sections) may be combined and configured as one apparatus (or processing section). In addition, needless to say, a configuration other than the above-described configurations may be added to the configuration of each apparatus (or each processing section). Further, a part of the configuration of one apparatus (or processing section) may be included in the configuration of another apparatus (or another processing section) as long as the configuration and operation as the entire system are substantially the same. In other words, the present technology is not limited to the embodiments described above, and various modifications can be made without departing from the scope of the present technology.

Although the preferred embodiments of the present disclosure have been described above in detail with reference to the accompanying drawings, the disclosure is not limited to these examples. A person having ordinally skill in the technical field of the present disclosure can obviously conceive of various alterations and modifications within the scope of the technical ideas in the appended claims, and it should be understood that they will naturally come within the technical scope of the present disclosure.

It is noted that the present technology can also be configured as follows.

(1) A solid-state imaging apparatus including:

for each pixel or each area block, a comparator circuit configured to compare a pixel signal with a reference signal temporally changing; and a data holding section configured to compare, using the reference signal, a magnitude of a pixel signal of a pixel of interest with a magnitude of each of pixel signals of neighboring pixels located in a neighborhood of the pixel of interest and hold a result of comparison of the magnitudes.

(2) The solid-state imaging apparatus according to (1), in which AD conversion of the pixel signal of the pixel of interest is performed using the comparator circuit and the reference signal, and a result of the AD conversion is held in the data holding section.

(3) The solid-state imaging apparatus according to (1), further including:

a second data holding section different from the data holding section and configured to perform AD conversion of the pixel signal of the pixel of interest in parallel with the comparison of the magnitude of the pixel signal of the pixel of interest with the magnitude of each of the pixel signals of the neighboring pixels located in the neighborhood of the pixel of interest and hold a result of the AD conversion.

(4) The solid-state imaging apparatus according to any one of (1) to (3), in which comparator circuit output signals of the neighboring pixels are connected to the data storage section of the pixel of interest.

(5) The solid-state imaging apparatus according to (4), in which the comparator circuit output signals of the neighboring pixels connected to the data storage section of the pixel of interest are fewer in number than the neighboring pixels that are compared with the pixel of interest.

(6) The solid-state imaging apparatus according to any one of (1) to (5), in which the neighboring pixels include adjacent pixels adjacent to the pixel of interest.

(7) Electronic equipment including:
a solid-state imaging apparatus including
for each pixel or each area block,
a comparator circuit configured to compare a pixel signal with a reference signal temporally changing, and
a data holding section configured to compare, using the reference signal, a magnitude of a pixel signal of a pixel of interest with a magnitude of each of pixel signals of neighboring pixels located in a neighborhood of the pixel of interest and hold a result of comparison of the magnitudes,
a signal processing circuit configured to process an output signal output from the solid-state imaging apparatus; and
an optical system configured to cause incident light to be incident on the solid-state imaging apparatus.

REFERENCE SIGNS LIST

1 Solid-state imaging apparatus, 11 Semiconductor substrate, 21, 21-0 to 21-8 Pixel, 23 Time code transferring section, 41 Pixel circuit, 42 ADC, 51 Comparator circuit, 52 Data storage section, 71 Latch control circuit, 72 Latch storage section, 241 Latch control circuit, 242, 242-1 to 242-N Bit storage section (latch circuit), 261 Transfer gate, 262 Latch storage section, 281, 282 Inverter, 283 NOR circuit, 284 Inverter, 371-1 to 371-N Bidirectional buffer circuit, 381 Buffer circuit, 382 Inverter circuit, 500 Demultiplexer circuit, 501, 501-1 to 501-8 Switch circuit, 510, 510-1 to 510-8 LBP-dedicated latch circuit, 511 Switch circuit

The invention claimed is:

1. A solid-state imaging apparatus, comprising:
a comparator circuit configured to:
compare a pixel signal of each pixel of a plurality of pixels with a reference signal, wherein
the reference signal is a slope signal, and
a voltage level of the slope signal decreases with passage of time; and
determine a plurality of output signals for the plurality of pixels based on the comparison of the pixel signal with the reference signal; and
first circuitry configured to:
compare, based on the reference signal and the plurality of output signals, a magnitude of a pixel signal of a pixel of interest of the plurality of pixels with a magnitude of a pixel signal each of a plurality of neighboring pixels of the plurality of pixels, wherein the plurality of neighboring pixels is adjacent to the pixel of interest; and
hold a result obtained based on the comparison of the magnitude of the pixel signal of the pixel of interest with the pixel signal of the each of the plurality of neighboring pixels.

2. The solid-state imaging apparatus according to claim 1, wherein
the comparator circuit is further configured to perform analog to digital (AD) conversion of the pixel signal of the pixel of interest based on the reference signal, and
the first circuitry is further configured to hold a result of the AD conversion.

3. The solid-state imaging apparatus according to claim 1, further comprising:
second circuitry different from the first circuitry, wherein the second circuitry is configured to:
perform analog to digital (AD) conversion of the pixel signal of the pixel of interest in parallel with the comparison of the magnitude of the pixel signal of the pixel of interest with the magnitude of the pixel signal of each of the plurality of neighboring pixels; and
hold a result of the AD conversion.

4. The solid-state imaging apparatus according to claim 1, wherein comparator circuit output signals of the plurality of neighboring pixels is connected to the first circuitry of the pixel of interest.

5. The solid-state imaging apparatus according to claim 4, wherein a number of the comparator circuit output signals of the plurality of neighboring pixels connected to the first circuitry of the pixel of interest is lesser than a number of the plurality of neighboring pixels that are compared with the pixel of interest.

6. An electronic equipment, comprising:
a solid-state imaging apparatus including:
a comparator circuit configured to:
compare a pixel signal of each pixel of a plurality of pixels with a reference signal, wherein
the reference signal is a slope signal, and
a voltage level of the slope signal decreases with a passage of time; and
determine a plurality of output signals for the plurality of pixels based on the comparison of the pixel signal with the reference signal; and
circuitry configured to:
compare, based on the reference signal and the plurality of output signals, a magnitude of a pixel signal of a pixel of interest of the plurality of pixels with a magnitude of a pixel signal of each of a plurality of neighboring pixels of the plurality of pixels, wherein the plurality of neighboring pixels is adjacent to the pixel of interest; and
hold a result obtained based on the comparison of the magnitude of the pixel signal of the pixel of interest with the pixel signal of each of the plurality of neighboring pixels;
a signal processing circuit configured to process the result; and
an optical system configured to cause incident light to be incident on the solid-state imaging apparatus.

7. A solid-state imaging apparatus, comprising:
a comparator circuit configured to:
compare a pixel signal of each pixel of a plurality of pixels with a reference signal; and
determine a plurality of output signals for the plurality of pixels based on the comparison of the pixel signal with the reference signal; and
circuitry configured to:
compare, based on the reference signal and the plurality of output signals, a magnitude of a pixel signal of a pixel of interest of the plurality of pixels with a magnitude of a pixel signal of each of a plurality of neighboring pixels of the plurality of pixels, wherein the plurality of neighboring pixels is adjacent to the pixel of interest, comparator circuit output signals of the plurality of neighboring pixels is connected to the circuitry of the pixel of interest, and a number of the comparator circuit output signals of the plurality of neighboring pixels connected to the circuitry of the pixel of interest is lesser than a number of the plurality of neighboring pixels that are compared with the pixel of interest; and hold a result obtained based on the comparison of the magnitude of the pixel signal of the pixel of interest with the pixel signal of the each of the plurality of neighboring pixels.

* * * * *